United States Patent
Sonoda et al.

(10) Patent No.: US 9,294,701 B2
(45) Date of Patent: Mar. 22, 2016

(54) IMAGE PICKUP APPARATUS, METHOD FOR DRIVING IMAGE PICKUP APPARATUS, IMAGE PICKUP SYSTEM, AND METHOD FOR DRIVING IMAGE PICKUP SYSTEM

(71) Applicant: CANON KABUSHIKI KAISHA, Tokyo (JP)

(72) Inventors: Kazuhiro Sonoda, Kawasaki (JP); Shintaro Takenaka, Yokohama (JP); Atsushi Furubayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 13/904,247

(22) Filed: May 29, 2013

(65) Prior Publication Data

US 2013/0321683 A1 Dec. 5, 2013

(30) Foreign Application Priority Data

Jun. 4, 2012 (JP) .................................. 2012-127388

(51) Int. Cl.
*H04N 5/378* (2011.01)

(52) U.S. Cl.
CPC ..................................... *H04N 5/378* (2013.01)

(58) Field of Classification Search
CPC ... H04N 5/378; H04N 5/37455; H04N 5/361; H04N 5/23212
See application file for complete search history.

(56) References Cited

U.S. PATENT DOCUMENTS

| 7,786,921 | B2 * | 8/2010 | Nitta | G06K 9/60 341/155 |
| 2009/0316015 | A1 * | 12/2009 | Iwasa | H04N 5/23232 348/222.1 |
| 2011/0205410 | A1 * | 8/2011 | Ahn | H01L 27/14621 348/273 |

FOREIGN PATENT DOCUMENTS

| JP | 2001-83407 A | 3/2001 |
| JP | 2006-33452 A | 2/2006 |
| JP | 2006-33453 A | 2/2006 |
| JP | 2010-28781 A | 2/2010 |
| JP | 2010-62764 A | 3/2010 |
| JP | 2010062764 A | * 3/2010 |
| JP | 2011-217206 A | 10/2011 |

\* cited by examiner

*Primary Examiner* — Ahmed A Berhan

(74) *Attorney, Agent, or Firm* — Canon USA, Inc. IP Division

(57) ABSTRACT

An image pickup apparatus, a method for driving the image pickup apparatus, an image pickup system, and a method for driving the image pickup system output a digital signal based on a difference between signals output from a plurality of pixels and a digital signal based on the sum of the signals output from the pixels.

12 Claims, 14 Drawing Sheets

IMAGE PICKUP APPARATUS, METHOD FOR DRIVING IMAGE PICKUP APPARATUS, IMAGE PICKUP SYSTEM, AND METHOD FOR DRIVING IMAGE PICKUP SYSTEM

BACKGROUND OF THE INVENTION

1. Field of the Invention

The present invention relates to an image pickup apparatus including pixels each having a photoelectric conversion unit therein and an analog-to-digital conversion unit.

2. Description of the Related Art

An image pickup apparatus including a pixel unit having pixels arranged in a matrix, each of the pixels performing photoelectric conversion and outputting a signal based on the incident light, and column parallel analog-to-digital conversion units (hereinafter referred to as "column ADCs") each provided for one of the pixel columns has been developed. The column ADC provided for each of the columns performs analog-to-digital conversion (hereinafter referred to as "AD conversion") in which an analog signal output from a pixel (hereinafter referred to as a "pixel signal") is converted into a digital signal.

An image pickup apparatus described in Japanese Patent Laid-Open No. 2011-217206 includes a first pixel that performs photoelectric conversion on environment light and a second pixel that performs photoelectric conversion on light including environment light and reflected light. The image pickup apparatus further includes first and second comparators provided for the first and second pixels, respectively, a difference circuit connected to the first and second comparators, and a counter that counts the number of clock pulses based on a difference signal output from the difference circuit and generates a count signal. Hereinafter, such an image pickup apparatus is referred to as a "first image pickup apparatus". In addition to the first image pickup apparatus, Japanese Patent Laid-Open No. 2011-217206 describes a second image pickup apparatus that has a third comparator in addition to the configuration of the first image pickup apparatus. The difference circuit of each of the first image pickup apparatus and the second image pickup apparatus outputs a difference signal to the counter from when the signal value of a comparison result signal of one of the first and second comparators varies to when the signal value of a comparison result signal of the other comparator varies. In the first image pickup apparatus, before the comparison operations are performed by the first comparator and the second comparator, different potentials are input to the two comparators. In this manner, in the first image pickup apparatus, a point in time at which the comparison result signal of the second comparator varies lags behind a point in time at which the comparison result signal of the first comparator varies at all times. Thus, a digital signal based on the difference between the analog signals output from the first and second pixels can be obtained regardless of a greater-lesser relationship between the analog signals output from the first and second pixels. In addition, in the second image pickup apparatus, by using the third comparator for sign detection, it can be determined which one of the analog signals output from the first and second pixels is larger.

Japanese Patent Laid-Open No. 2010-62764 describes an image pickup apparatus that outputs comparison result signals of a plurality of comparators each comparing a signal output from a different pixel with a reference signal. The image pickup apparatus includes a counter that switches between up-counting and down-counting based on the order in which the signal values of the comparison result signals of the plurality of comparators vary. In addition, during a period of time during which the signal values of the comparison result signals differ from one another, the image pickup apparatus causes the counter to operate to count the number of clock pulses. In this manner, a digital signal can be obtained based on the differences among the signals output from a plurality of pixels.

Japanese Patent Laid-Open No. 2010-28781 describes an image pickup apparatus that outputs comparison result signals of a plurality of comparators each comparing a signal output from a different pixel with a reference signal. If the signal values are the same, the count of the number of clock pulses per unit time is made double the count of the number of clock pulses per unit time when the signal values of the comparison result signals of the plurality of comparators differ from one another. In this manner, a digital signal can be obtained based on the sum of the signals output from a plurality of pixels 100.

Japanese Patent Laid-Open No. 2001-83407 describes an image pickup apparatus that includes a plurality of photoelectric conversion units each provided for one of microlenses two-dimensionally arranged in a microlens array and that performs focus detection of a phase difference detection scheme. In addition, the following three signals are output: a signal based on a signal carrier of a first photoelectric conversion unit of the photoelectric conversion units, a signal based on a signal carrier of a second photoelectric conversion unit of the photoelectric conversion units that differs from the first photoelectric conversion unit, and a signal based on the sum of the signal carriers of the first and second photoelectric conversion units.

SUMMARY OF THE INVENTION

According to an embodiment of the present invention, an image pickup apparatus includes a first pixel and a second pixel each having a photoelectric conversion unit that generates a signal carrier based on incident light, and an analog-to-digital conversion unit. The first pixel outputs a first photoelectric conversion signal based on the signal carrier, and the second pixel outputs a second photoelectric conversion signal based on the signal carrier. The analog-to-digital conversion unit includes a first comparator that outputs a first comparison result signal having a signal value obtained by comparing the first photoelectric conversion signal with a reference signal having a potential varying in a time-dependent manner and a second comparator that outputs a second comparison result signal having a signal value obtained by comparing the second photoelectric conversion signal with the reference signal. Based on the first comparison result signal and the second comparison result signal, the analog-to-digital conversion unit generates a first digital signal and a second digital signal. The first digital signal is based on a difference between the first photoelectric conversion signal and the second photoelectric conversion signal, and the second digital signal is based on a sum of the first photoelectric conversion signal and the second photoelectric conversion signal.

According to another embodiment of the present invention, a method for driving an image pickup apparatus is provided. The image pickup apparatus includes a first pixel and a second pixel each having a photoelectric conversion unit that generates a signal carrier based on incident light, and an analog-to-digital conversion unit, the analog-to-digital conversion unit including a first comparator that outputs a first comparison result signal having a signal value obtained by comparing the first photoelectric conversion signal with a reference signal having a potential varying in a time-dependent manner and a second comparator that outputs a second comparison result signal having a signal value obtained by comparing the second photoelectric conversion signal with the reference signal. The method includes outputting, from the first pixel, a first photoelectric conversion signal based on the signal carrier, outputting, from the second pixel, a second photoelectric conversion signal based on the signal carrier, and generating, using the analog-to-digital conversion unit, a first digital signal based on a difference between the first photoelectric conversion signal and the second photoelectric conversion signal and a second digital signal based on a sum of the first photoelectric conversion signal and the second photoelectric conversion signal based on the first comparison result signal and the second comparison result signal.

According to still another embodiment of the present invention, a method for driving an image pickup system is provided. The image pickup system includes an image pickup apparatus, an output signal processing unit that processes a signal output from the image pickup apparatus, and an optical system that directs light to the image pickup apparatus. The image pickup apparatus includes a plurality of pixels each having a photoelectric conversion unit and outputting a photoelectric conversion signal based on a signal charge generated by the photoelectric conversion unit, a plurality of microlenses each collecting light onto a plurality of the pixels, a first comparator that outputs a first comparison result signal having a signal value obtained by comparing the photoelectric conversion signal of a first pixel among the plurality of pixels with a reference signal having a potential varying in a time-dependent manner, a second comparator that outputs a second comparison result signal having a signal value obtained by comparing a photoelectric conversion signal of a second pixel different from the first pixel with the reference signal having a potential varying in a time-dependent manner, and first and second counters each generating a count signal having a signal value obtained by counting the number of clock pulses. The method includes selecting one of an increase and a decrease in the signal value of the count signal based on an order in which each of the first comparison result signal and the second comparison result signal varies and counting, using the first counter, the number of clock pulses during a period of time during which the signal value of the first comparison result signal differs from the signal value of the second comparison result signal, when the first comparator compares the photoelectric conversion signal of the first pixel with the reference signal and if the second comparator compares the photoelectric conversion signal of the second pixel with the reference signal, causing the second counter to generate the count signal using first counting in which the number of clock pulses is counted during a period of time during which the signal value of the first comparison result signal is the same as the signal value of the second comparison result signal and second counting in which the number of clock pulses is counted during a period of time during which the signal value of the first comparison result signal differs from the signal value of the second comparison result signal so that counting of the number of clock pulses per unit time in the first counting is greater than counting of the number of clock pulses per unit time in the second counting, during a period of time during which the signal values of the first comparison result signal and the second comparison result signal differ from the signal values obtained when comparison of the photoelectric conversion signal of the first pixel and the reference signal performed by the first comparator and comparison of the photoelectric conversion signal of the second pixel and the reference signal performed by the second comparator start, causing the first counter and the second counter to stop counting the number of clock pulses, causing the first counter to generate a first digital signal based on a difference between the photoelectric conversion signal of the first pixel and the photoelectric conversion signal of the second pixel, and causing the second counter to generate a second digital signal based on a sum of the photoelectric conversion signal of the first pixel and the photoelectric conversion signal of the second pixel, causing the image pickup apparatus to output the first digital signal and the second digital signal to the output signal processing unit, and causing the output signal processing unit to perform focus detection based on the first digital signal and image formation based on the second digital signal.

According to yet another embodiment of the present invention, a method for driving an image pickup system is provided. The image pickup system includes an image pickup apparatus, an output signal processing unit that processes a signal output from the image pickup apparatus, and an optical system that directs light to the image pickup apparatus. The image pickup apparatus includes a plurality of pixels each having a photoelectric conversion unit and outputting a noise signal and a photoelectric conversion signal based on a signal charge generated by the photoelectric conversion unit, a plurality of microlenses each collecting light onto a plurality of the pixels, a first comparator that outputs a first comparison result signal having a signal value obtained by comparing each of the noise signal and the photoelectric conversion signal of a first pixel of the plurality of pixels with a reference signal having a potential varying in a time-dependent manner, a second comparator that outputs a second comparison result signal having a signal value obtained by comparing each of the noise signal and the photoelectric conversion signal of a second pixel different from the first pixel with a reference signal having a potential varying in a time-dependent manner, and first and second counters each generating a count signal having a signal value obtained by counting the number of clock pulses. The method includes, when the first comparator and the second comparator compare the noise signal with the reference signal, causing the first counter to count the number of clock pulses using one of an increase and a decrease in the signal value of the count signal during a period of time during which the signal value of the first comparison result signal differs from the signal value of the second comparison result signal, when the first comparator compares the photoelectric conversion signal of the first pixel with the reference signal and if the second comparator compares the photoelectric conversion signal of the second pixel with the reference signal, causing the first counter to count the number of clock pulses using the other of the increase and decrease in the signal value of the count signal during a period of time during which the pixel value of the first comparison result signal differs from the pixel value of the second comparison result signal, when the first comparator compares the photoelectric conversion signal of the first pixel with the reference signal and if the second comparator compares the photoelectric conversion signal of the second pixel with the reference signal, causing the second counter to generate the count signal using first counting in which the number of clock pulses is counted during a period of time during which the signal value of the first comparison result signal is the same as the signal value of the second comparison result signal and second counting in which the number of clock pulses is counted during a period of time during which the signal value of the first comparison result signal differs from the signal value of the second comparison result signal so that counting of the number of clock pulses per unit time in the first counting is greater than counting of the number of clock pulses per unit time in the second counting, during a period of time during which the signal values of the first comparison result signal and the second comparison result signal differ from the signal values obtained when comparison of the photoelectric conversion signal of the first pixel and the reference signal performed by the first comparator and comparison of the photoelectric conversion signal of the second pixel and the reference signal performed by the second comparator start, causing the first counter and the second counter to stop counting the number of clock pulses, causing the first counter to generate a first digital signal based on a difference between the photoelectric conversion signal of the first pixel and the photoelectric conversion signal of the second pixel, and causing the second counter to generate a second digital signal based on a sum of the photoelectric conversion signal of the first pixel and the photoelectric conversion signal of the second pixel, obtaining a signal indicating whether the first digital signal is positive or negative based on which one of the signal value of the first comparison result signal and the signal value of the second comparison result signal varies first, causing the image pickup apparatus to output the first digital signal, the second digital signal, and the signal indicating whether the first digital signal is positive or negative to the output signal processing unit, and causing the output signal processing unit to perform focus detection based on the first digital signal and the signal indicating whether the first digital signal is positive or negative and image formation based on the second digital signal.

Further features of the present invention will become apparent from the following description of exemplary embodiments with reference to the attached drawings.

DESCRIPTION OF THE EMBODIMENTS

Existing image pickup apparatuses do not output both a digital signal based on differences among signals output from a plurality of pixels and a digital signal based on the sum of the signals output from the pixels. The following exemplary embodiments relate to an image pickup apparatus that output both a digital signal based on a difference among signals output from a plurality of pixels and a digital signal based on the sum of the signals output from the pixels.

First Exemplary Embodiment

An image pickup apparatus according to a first exemplary embodiment is described below with reference to the accompanying drawings.

Figure 1:
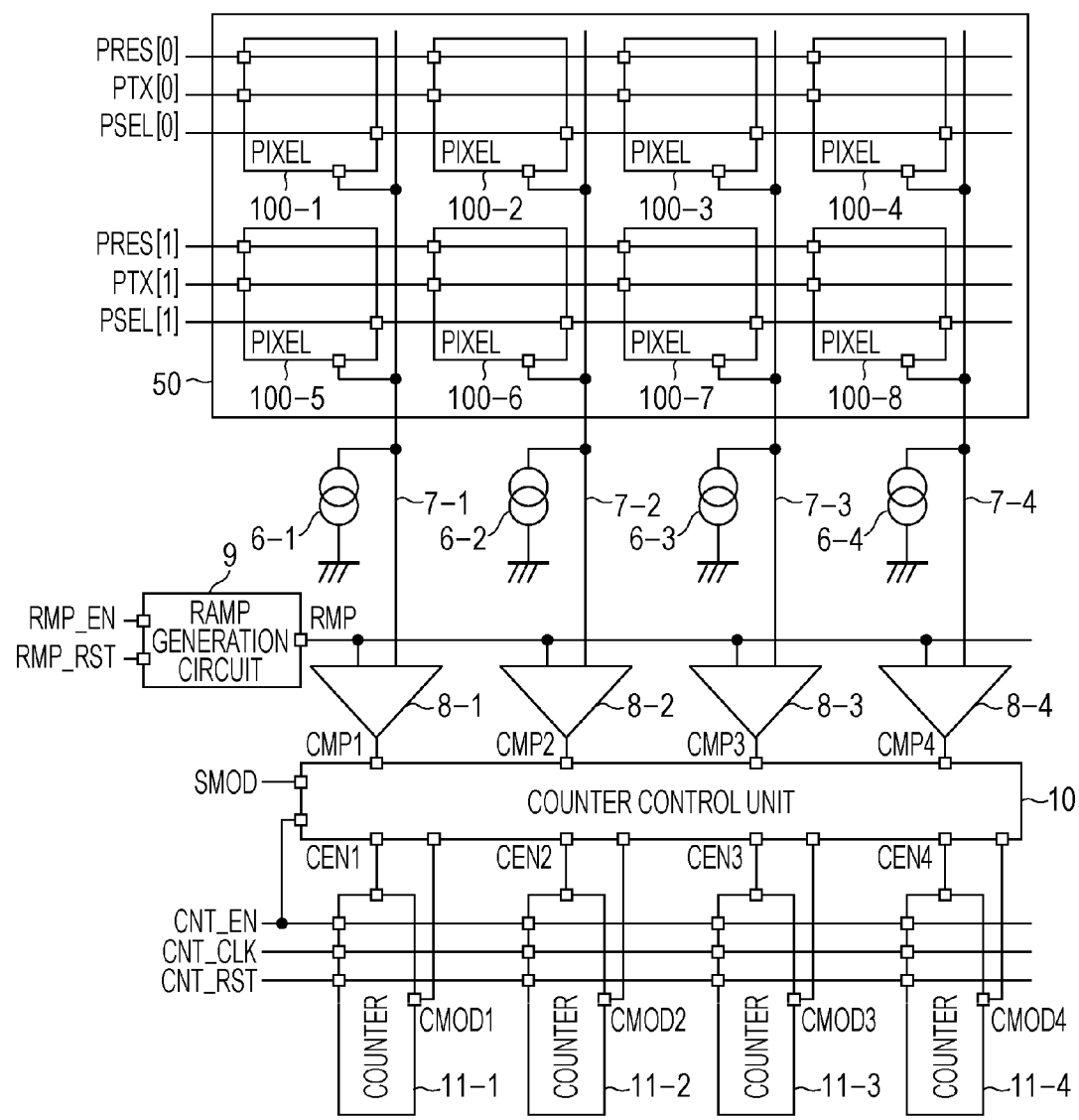
FIG. 1 is a block diagram of an example of an image pickup apparatus according to an embodiment of the present invention.

FIG. 1 is a block diagram of an example of an image pickup apparatus according to the present exemplary embodiment. The image pickup apparatus includes a plurality of pixels 100-1 to 100-8 arranged in a matrix. In FIG. 1, the pixels 100 arranged in 2 rows and 4 columns are schematically illustrated. The pixels 100 in each of the columns output signals to one of vertical signal lines 7-1 to 7-4 corresponding to the column. The pixels 100 receive pulses PRES, PTX, and PSEL from a vertical scanning circuit (not illustrated). Each of the pulses supplied to the first row is indicated by a reference symbol representing a pulse with a suffix "[0]". Similarly, each of the pulses supplied to the second row is indicated by a reference symbol representing a pulse with a suffix "[1]".

Current sources 6-1 to 6-4 supply electric currents to the vertical signal lines 7-1 to 7-4, respectively. In addition, signals output from the pixels 100 to the vertical signal lines 7-1 to 7-4 are provided to one of terminals of comparators 8-1 to 8-4, respectively. A ramp generation circuit 9 receives pulses RMP_EN and RMP_RST from a timing generator (not illustrated). In addition, upon receiving the pulses RMP_EN and RMP_RST, the ramp generation circuit 9 provides a ramp signal to the other terminals of the comparators 8-1 to 8-4. The comparators 8-1 to 8-4 outputs comparison result signals CMP1 to CMP4, respectively, to a counter control unit 10. The timing generator outputs a pulse SMOD to the counter control unit 10. In addition, the timing generator outputs pulses CNT_EN, CNT_CLK, and CNT_RST to counters 11-1 to 11-4. The counter control unit outputs pulses CEN1 to CEN4 and pulses CMOD1 to CMOD4 to the counters 11-1 to 11-4, respectively. Each of the comparators 8-1 to 8-4 is provided so as to correspond to one of the columns of the pixels 100. Similarly, each of the counters 11-1 to 11-4 is provided so as to correspond to one of the columns of the pixels 100. According to the present exemplary embodiment, an analog signal output unit 50 includes the plurality of pixels 100.

Figure 2:
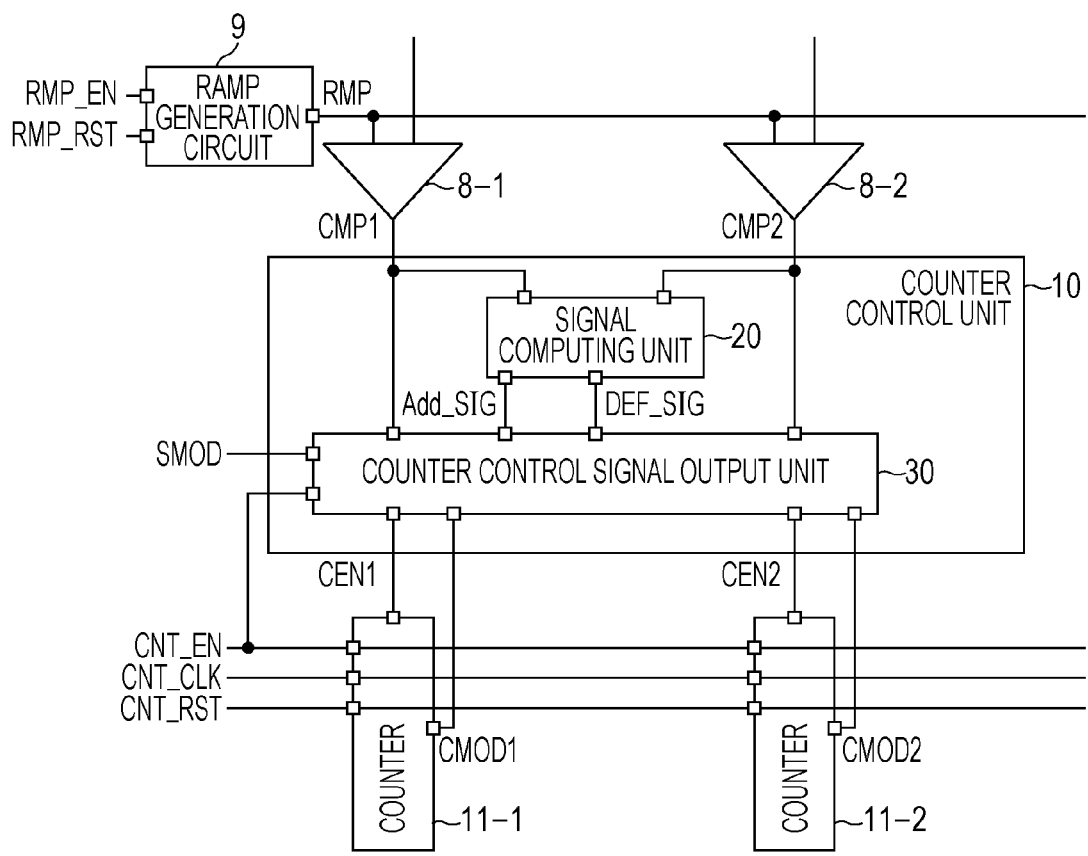
FIG. 2 is a block diagram of a counter control unit of the image pickup apparatus.

An exemplary configuration of the counter control unit 10 is described below with reference to FIG. 2. FIG. 2 illustrates only two columns, that is, the column for which the comparator 8-1 and the counter 11-1 of the image pickup apparatus illustrated in FIG. 1 are provided and the column for which the comparator 8-2 and the counter 11-2 are provided. According to the present exemplary embodiment, the counter control unit 10 can include a signal computing unit 20 and a counter control signal output unit 30. The signal computing unit 20 receives the comparison result signals CMP1 and CMP2 output from the comparators 8-1 and 8-2, respectively. As used herein, the comparison result signal CMP1 is referred to as a "first comparison result signal", and the comparison result signal CMP2 is referred to as a "second comparison result signal". The signal computing unit 20 outputs a signal DEF_SIG to the counter control signal output unit 30 based on the comparison result signals CMP1 and CMP2. In addition to signals Add_SIG and DEF_SIG output from the signal computing unit 20, the counter control signal output unit 30 receives the comparison result signals CMP1 and CMP2. The counter control signal output unit 30 further receives the pulse SMOD and the pulse CNT_EN. The counter control signal output unit 30 selects a pair of the comparison result signals CMP1 and CMP2 or a pair of the signals Add_SIG and DEF_SIG based on the signal level of the pulse SMOD and outputs the selected two signals as pulses CEN1 and CEN2 to the counters 11-1 and 11-2. If the pulse SMOD is at the L level, the counter control signal output unit 30 outputs the comparison result signal CMP1 to the counter 11-1 as the pulse CEN1. In addition, the counter control signal output unit 30 outputs the comparison result signal CMP2 to the counter 11-2 as the pulse CEN2. In contrast, if the pulse SMOD is at the H level, the counter control signal output unit 30 outputs the signal Add_SIG to the counter 11-1 as the pulse CEN1. In addition, the counter control signal output unit 30 outputs the signal DEF_SIG to the counter 11-2 as the pulse CEN2. Conversely, the counter control signal output unit 30 may output the signal DEF_SIG as the pulse CEN1 and output the signal Add_SIG as the pulse CEN2. The counter control signal output unit 30 further outputs the pulse CMOD1 to the counter 11-1. Still furthermore, the counter control signal output unit 30 outputs the pulse CMOD2 to the counter 11-2. According to the present exemplary embodiment, the circuit configuration of each of the signal computing unit 20 and the counter control signal output unit 30 is not limited to any particular configuration. For example, the signal computing unit 20 can be configured using an EXOR circuit. The pulse CMOD is a signal having at least two bits. Hereinafter, a reference symbol "CMOD(0)" is used to indicate a first bit of the 2-bit pulse CMOD, and a reference symbol "CMOD(1)" is used to indicate a second bit of the 2-bit pulse CMOD.

In the image pickup apparatus according to the present exemplary embodiment, the counter 11-1 sets the weight for counting the number of clock pulses given during a period during which the signal values of the comparison result signals output from the plurality of comparators are the same to greater than that during which the signal values of the comparison result signals output from the plurality of comparators differ from one another. In this manner, the counter 11-1 generates a count signal based on the sum of the pixel signals output from the pixels 100-1 and 100-2. The counter 11-1 is a "second counter". In addition, counting of the number of clock pulses given during a period during which the signal values of the comparison result signals output from the plurality of comparators are the same is "first counting". Counting of the number of clock pulses given during a period during which the signal values of the comparison result signals output from the plurality of comparators differ from one another is "second counting". Furthermore, the counter 11-2 counts the number of clock pulses during a period during which the signal values of the comparison result signals output from the plurality of comparators differ from one another. The counter 11-2 is a "first counter".

Each of the pixels 100 according to the present exemplary embodiment is described next with reference to FIG. 3.

Figure 3:
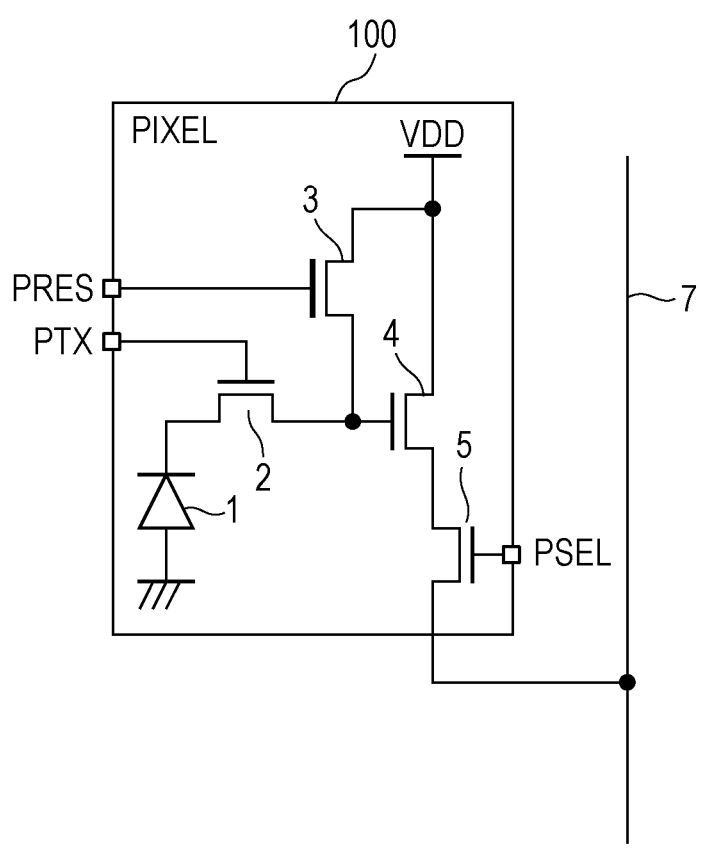
FIG. 3 illustrates an example of the configuration of a pixel.

FIG. 3 illustrates an example of the configuration of the pixel 100 according to the present exemplary embodiment. The pixel 100 includes a photodiode 1, a transfer MOS transistor 2, a reset MOS transistor 3, an amplifying MOS transistor 4, and a selection MOS transistor 5.

The photodiode 1 generates a signal carrier in accordance with the quantity of incident light. The photodiode 1 serves as a photoelectric conversion unit. If a pulse PTX that controls the conductive state of the transfer MOS transistor 2 is activated, the signal carrier generated by the photodiode 1 is transferred to a node of a control electrode of the amplifying MOS transistor 4. Hereinafter, the node is referred to as a "floating diffusion (FD) portion". If a pulse PSEL that controls the conductive state of the selection MOS transistor 5 is activated, a signal output from the amplifying MOS transistor 4 via the selection MOS transistor 5 is provided to a vertical signal line 7. If a pulse PRES that controls the conductive state of the reset MOS transistor 3 is activated, the potential of the FD portion is reset in accordance with the potential of a power supply VDD.

An example of an AD conversion operation performed by the image pickup apparatus according to the present exemplary embodiment is described next with reference to FIG. 4.

In the operation described below, if a pulse provided to the control electrode of a transistor is at a High level, it is considered that the pulse is active (hereinafter, the High level is simply referred to as "H level", and Low level is simply referred to as "L level"). That is, if the pulse provided to the control electrode of a transistor is at the H level, electrical continuity is established between the main electrodes of the transistor. In addition, at all of the following points in time, the pulse SMOD provided to the counter control unit 10 remains at the H level. If the pulse SMOD provided to the counter control unit 10 is at the H level, the counter control unit 10 outputs, to each of counters 11, a difference signal based on a difference between times at which comparison result signals output from a plurality of comparators 8 vary. In contrast, if the pulse SMOD is at the L level, the counter control unit 10 outputs the comparison result signal output from each of the comparators 8 to one of the counters 11 corresponding to the comparator 8. That is, the counter 11-1 operates based on the comparison result signal CMP1 output from the comparator 8-1. "VL" in FIG. 4 represents the potentials of the vertical signal lines 7, "VL1" represents the potential of the vertical signal line 7-1, and "VL2" represents the potential of the vertical signal line 7-2.

Hereinafter, a signal output from the pixel 100 to the vertical signal line 7 when the potential of the FD portion is reset is referred to as an "AN signal". In particular, a signal output from the pixel 100-1 to the vertical signal line 7-1 when the potential of the FD portion is reset is referred to as an "AN1 signal". Similarly, a signal output from the pixel 100-2 to the vertical signal line 7-2 when the potential of the FD portion is reset is referred to as an "AN2 signal". In addition, a signal output from the pixel 100 to the vertical signal line 7 when a signal carrier generated by the photodiode 1 based on incident light is transferred to the FD portion is referred to as an "AS signal". In addition, the AS signal output from the pixel 100-1 to the vertical signal line 7-1 is referred to as an "AS1 signal". Similarly, the AS signal output from the pixel 100-2 to the vertical signal line 7-2 is referred to as an "AS2 signal". According to the present exemplary embodiment, the first comparator is the comparator 8-1, and the second comparator is the comparator 8-2. According to the present exemplary embodiment, the first photoelectric conversion signal output from the analog signal output unit 50 to the first comparator is the AS1 signal output from the pixel 100-1. In addition, the second photoelectric conversion signal output from the analog signal output unit 50 to the second comparator is the AS2 signal output from the pixel 100-2.

According to the present exemplary embodiment, the following four cases based on a greater-lesser relationship between the signal amplitudes of the AN1 signal and AN2 signal and a greater-lesser relationship between the AS1 signal and the AS2 signal are described below. As used herein, the term "signal amplitude" refers to a changing quantity from the potential of the vertical signal line 7 when any signal is not output from the pixel 100. The four cases are followings:

(1) AN1 signal<AN2 signal, and AS1 signal<AS2 signal
(2) AN1 signal>AN2 signal, and AS1 signal>AS2 signal
(3) AN1 signal>AN2 signal, and AS1 signal<AS2 signal
(4) AN1 signal<AN2 signal, and AS1 signal>AS2 signal Greater-Lesser Relationship between Signal Amplitudes of Vertical Signal Lines 7-1 and 7-2 and Pulses CMOD1(0) and CMOD2(0)

The following TABLE 1 summarizes the cases (1) to (4) based on the greater-lesser relationship between the signal amplitudes and the pulses CMOD1(0) and CMOD2(0) output from the counter control unit 10 to the counter 11. The pulse CMOD is used to switch between an increase and a decrease in the signal value of the count signal generated by the counter 11 based on the counting the number of the clock pulses CNT_CLK. If the pulse CMOD is at the L level, the signal value of the count signal generated by the counter 11 is increased due to counting of the number of the clock pulses CNT_CLK. This operation to increase the signal value of the count signal generated by the counter 11 due to counting of the number of the clock pulses CNT_CLK is referred to as "up-counting". In contrast, if the pulse CMOD is at the H level, the signal value of the count signal generated by the counter 11 is decreased due to counting of the number of the clock pulses CNT_CLK. This operation to decrease the signal value of the count signal generated by the counter 11 due to counting of the number of the clock pulses CNT_CLK is referred to as "down-counting". Note that in TABLE 1, for the pulse CMOD1(0), each of the entries for "N Conversion Period" contains "H" if a period during which the pulse CMOD1(0) goes from the L level to the H level is present in the N conversion period. However, if the pulse CMOD1(0) remains at the level L during the entire N conversion period, the entry contains "L". The entries for "S Conversion Period" are set in a similar manner. The same applies to representation for the pulse CMOD2(0).

TABLE 1

| Greater-Lesser Relationship between Signal Amplitudes | N Conversion Period | | S Conversion Period | |
|---|---|---|---|---|
| | Pulse CMOD1(0) | Pulse CMOD2(0) | Pulse CMOD1(0) | Pulse CMOD2(0) |
| (1) | H | L | L | H |
| (2) | | H | H | L |
| (3) | | H | H | |
| (4) | | L | | L |

Case (1) of Greater-Lesser Relationship Between Signal Amplitudes

The operation performed when, in terms of the signal amplitudes, AN1 signal <AN2 signal, and AS1 signal<AS2 signal is described below.

The operations performed by the pixels 100 in the first and second columns from the left in FIG. 1, the comparators 8, and the counters 11 of the image pickup apparatus illustrated in FIG. 1 are described below. Hereinafter, the term "n-th column" refers to an n-th column from the left of a drawing. Note that the operations performed by the pixels 100 in the third and fourth columns, the comparators 8, and the counters 11 are similar to the operations performed by the pixels 100 in the first and second columns, the comparators 8, and the counters 11.

The operation performed by the counter 11-2 is mainly described first.

At a time t1, the timing generator switches the pulse PSEL to the H level. Thus, signals based on the potentials of the FD portions of the pixels 100 are output to the vertical signal lines 7-1 and 7-2. In addition, the timing generator switches the pulse PRES to the H level. In this manner, the reset MOS transistor 3 becomes electrically conductive and, thus, the potentials of the FD portions are reset.

At a time t2, the timing generator ends resetting of the potential of the FD portion by switching the pulse PRES to the L level. In addition, at the time t2, the timing generator switches the pulse CNT_RST to the H level and, thereafter, switches the pulse CNT_RST to the L level. In this manner, the count signals held by the counters 11-1 to 11-4 are reset to the initial values.

At a time t3, the timing generator switches the pulse RMP_RST to the L level. By maintaining the pulse RMP_RST at the H level, the potential of a ramp signal RMP generated by the ramp generation circuit 9 is being reset. The ramp signal serves as a reference signal according to the present exemplary embodiment.

At a time t4, the timing generator switches the pulse RMP_EN to the H level. Thus, the ramp generation circuit 9 starts changing the potential of a ramp signal of the ramp generation circuit 9 in a time-dependent manner. The comparator 8-1 compares the AN1 signal being output from the pixel 100-1 to the vertical signal line 7-1 with the ramp signal. The comparator 8-2 compares the AN2 signal being output from the pixel 100-2 to the vertical signal line 7-2 with the ramp signal.

In addition, at a time t4, the timing generator switches the pulse CNT_EN to the H level. The comparison result signals CMP1 and CMP2 output from the comparators 8-1 and 8-2, respectively, to the counter control unit 10 are at the H level. While the comparison result signals CMP1 and CMP2 are at the H level, the counter control unit 10 maintains the pulse CEN2 at the L level. If the pulse CEN2 is at the L level, the counter 11-2 does not count the number of the clock pulses CNT_CLK.

At a time t5, if the greater-lesser relationship between the potential VL1 of the vertical signal line 7-1 and the potential of the ramp signal RMP is reversed, the signal level of the comparison result signal CMP1 is set to the L level.

If the signal value of the comparison result signal CMP1 differs from the signal value of the comparison result signal CMP2, the counter control unit 10 switches the pulse CEN2 to the H level. Accordingly, at a time t5, the counter control unit 10 switches the pulse CEN2 to the H level. When the pulse CNT_EN is set to the H level and if the pulse CEN2 is set to the H level, the counter 11-2 starts counting the number of the clock pulses CNT_CLK. The counter control unit 10 switches the pulse CMOD2(0) to the L level. Thus, the counter 11-2 counts the number of the clock pulses CNT_CLK through up-counting.

If, at a time t6, the greater-lesser relationship between the potential VL2 of the vertical signal line 7-2 and the potential of the ramp signal RMP is reversed, the signal level of the comparison result signal CMP2 is switched to the L level. Accordingly, the counter control unit 10 switches the pulse CEN2 to the L level. In this manner, the counter 11-2 holds the count signal as of that time. The count signal held by the counter 11-2 is a digital signal based on the absolute value of the potential difference between the potential VL1 of the vertical signal line 7-1 and the potential VL2 of the vertical signal line 7-2, that is, a digital signal based on the absolute value of the difference between the AN1 signal and the AN2 signal. Hereinafter, this count signal is referred to as a "|DN1−DN2|signal". Similarly, a DS'1−DS'2 signal (described below) is referred to as a |DS'1−DS'2| signal using an absolute value sign. Note that the DN2 signal represents a count signal obtained when the counter 11-2 counts the number of the clock pulses CNT_CLK from the time t4 to the time t6. The |DN1−DN2| signal serves as a first difference signal according to the present exemplary embodiment.

At a time t7, the pulse RMP_EN is switched to the L level. Thus, the ramp generation circuit 9 stops changing the potential of the ramp signal in a time-dependent manner. In addition, the timing generator switches the pulse CNT_EN to the L level. Furthermore, the counter control unit 10 switches the pulse CMOD1(0) to the L level. Hereinafter, the operation performed from the time t4 to the time t7 is referred to as "N conversion". In addition, a period of time from the time t4 to the time t7, that is, a period of time during which the AN signal is compared with the ramp signal, is referred to as an "N conversion period".

At a time t8, the timing generator switches the pulse RMP_RST to the H level. Thus, the potential of the ramp signal is reset.

At a time t9, the timing generator switches the pulse PTX to the H level.

At a time t10, the timing generator switches the pulse PTX to the L level. Thus, the AS1 signal is output to the vertical signal line 7-1, and the AS2 signal is output to the vertical signal line 7-2.

At a time t11, the timing generator switches the pulse RMP_RST to the L level.

At a time t12, the timing generator switches the pulse RMP_EN to the H level. Thus, the ramp generation circuit 9 starts changing the potential of the ramp signal RMP in a time-dependent manner. The comparator 8-1 compares a signal output from the pixel 100-1 to the vertical signal line 7-1 (hereinafter, a signal output from the pixel 100-1 to the vertical signal line 7-1 at the time t12 is referred to as an "AS1 signal") with the ramp signal. The comparator 8-2 compares a signal output from the pixel 100-2 to the vertical signal line 7-2 (hereinafter, a signal output from the pixel 100-2 to the vertical signal line 7-2 at the time t12 is referred to as an "AS2 signal") with the ramp signal.

In addition, at the time t12, the timing generator switches the pulse CNT_EN to the H level. Each of the comparison result signals CMP1 and CMP2 output from the comparators 8-1 and 8-2 to the counter control unit 10, respectively, is at the H level. The pulse CMOD1(0) output from the counter control unit 10 remains at the L level. Thus, the counter 11-1 counts the number of the clock pulses CNT_CLK through up-counting. The counter 11-1 starts counting the number of the clock pulses CNT_CLK from the count signal held at the time t5. In addition, during a period of time during which the comparison result signals CMP1 and CMP2 are at the H level, the counter control unit 10 maintains the pulse CEN2 at the L level. If the pulse CEN2 is at the L level, the counter 11-2 does not count the number of the clock pulses CNT_CLK.

If, at a time t13, the greater-lesser relationship between the potential VL1 of the vertical signal line 7-1 and the potential of the ramp signal RMP is reversed, the signal level of the comparison result signal CMP1 is set to the L level.

The counter control unit 10 switches the pulse CEN2 to the H level. When the pulse CNT_EN is at the H level and if the pulse CEN2 is at the H level, the counter 11-2 starts counting the number of the clock pulses CNT_CLK. The counter control unit 10 switches the pulse CMOD2(0) to the H level. In this manner, the counter 11-1 counts the number of the clock pulses CNT_CLK through down-counting.

If, at a time t14, the greater-lesser relationship between the potential VL2 of the vertical signal line 7-2 and the potential of the ramp signal RMP is reversed, the signal level of the comparison result signal CMP2 is set to the L level. Accordingly, the counter control unit 10 switches the pulse CEN2 to the L level. Thus, the counter 11-2 holds the count signal as of that time. The count signal held by the counter 11-2 is a digital signal based on the absolute value of the potential difference between the potential VL1 of the vertical signal line 7-1 and the potential VL2 of the vertical signal line 7-2, that is, a digital signal based on the absolute value of the difference between the AS1 signal and the AS2 signal. As noted above, this count signal is referred to as a "|DS'1−DS'2| signal". Note that the DS'1 signal represents a count signal obtained when the counter 11-1 counts the number of the clock pulses CNT_CLK through down-counting from the time t12 to the time t13. The DS'1 signal is a digital signal based on a signal obtained by subtracting the DN1 signal, which is obtained by digital-converting the AN1 signal, from a signal obtained by digital-converting the AS1 signal (hereinafter referred to as a "DS1 signal"). The DS'2 signal represents a count signal obtained when the counter 11-2 counts the number of the clock pulses CNT_CLK through down-counting from the time t12 to the time t14. A digital signal excluding a noise component of the pixel 100 and an operation-to-operation variation among the comparators 8 can be obtained. That is, a digital signal can be obtained based on a signal obtained by subtracting differences among a plurality of AN signals from differences among a plurality of AS signals. During a period of time during which the signal value of each of the comparison result signals CMP1 and CMP2 (i.e., the L level) differs from the signal value when the comparators 8-1 and 8-2 start the comparison operation (i.e., the H level), the counter 11-2 stops counting the number of clock pulses. In this manner, the counter 11-1 continues to hold the |DS'1−DS'2| signal.

At a time t15, the timing generator switches the pulse RMP_EN to the L level. Thus, the ramp generation circuit 9 completes changing the potential of the ramp signal in a time-dependent manner. In addition, the timing generator switches the pulse CNT_EN to the L level. Furthermore, the counter control unit 10 switches the pulse CMOD2(0) to the L level. Hereinafter, the operation performed from the time t12 to the time t15 is referred to as "S conversion". In addition, the period of time from the time t12 to the time t15, that is, the period of time during which the AS signal is compared with the ramp signal is referred to as an "S conversion period".

At a time t16, the timing generator switches the pulse RMP_RST to the H level. Thus, the potential of the ramp signal is reset.

In addition, at the time t16, the timing generator switches the pulse PRES to the H level. Thus, the potential of the FD portion is reset.

Through the above-described operations, the |DS'1−DS'2| signal can be obtained in the counter 11-2.

The operation related to the counter 11-1 is mainly described below.

At a time t4, the counter control unit 10 switches the pulses CMOD1(0) and CMOD1(1) to the H level. When the pulse CMOD1(1) is at the H level, the count number for one clock pulse CNT_CLK of the counter 11-1 is made double the count number used when the pulse CMOD1(1) is at the L level. More specifically, when the pulse CMOD1(1) is at the L level, the counter 11-1 counts either the rising edge or the falling edge of the clock pulse CNT_CLK. In contrast, when the pulse CMOD1(1) is at the H level, the counter 11-1 counts the rising edge and the falling edge of the clock pulse CNT_CLK. Such a count mode used when the pulse CMOD1(1) is at the L level is referred to as a "single count mode", and a count mode used when the pulse CMOD1(1) is at the H level is referred to as a "double count mode". The counter control unit 10 switches the pulse CEN1 to the H level. In this manner, the counter 11-1 counts the number of the clock pulses CNT_CLK in a double count mode through down-counting.

If, at a time t5, the greater-lesser relationship between the potential VL1 of the vertical signal line 7-1 and the potential of the ramp signal RMP is reversed, the signal level of the comparison result signal CMP1 is set to the L level. Accordingly, the counter control unit 10 switches the pulse CMOD1(1) to the L level. Thus, the counter 11-1 enters a single count mode from the double count mode and counts the number of the clock pulse CNT_CLK.

If, at a time t6, the greater-lesser relationship between the potential VL2 of the vertical signal line 7-2 and the potential of the ramp signal RMP is reversed, the signal level of the comparison result signal CMP2 is switched to the L level. Thus, the counter control unit 10 switches the pulse CEN1 to the L level.

The count signal held by the counter 11-1 at the time t6 is described below.

The counter 11-1 counts the number of the clock pulses CNT_CLK in a double count mode from the time t4 to the time t5. The signal held by the counter 11-1 at the time t5 is a digital signal based on a signal that is double the AN1 signal (hereinafter referred to as a 2AN1 signal). The counter 11-1 counts the number of the clock pulses CNT_CLK in a single count mode from the time t5 to the time t6. The digital signal obtained by counting the number of the clock pulses CNT_CLK during only a period from the time t5 to the time t6 is a digital signal based on a signal obtained by subtracting the AN1 signal from the AN2 signal (hereinafter referred to as an "AN2−AN1 signal"). Accordingly, the digital signal obtained when the counter 11-1 counts the number of the clock pulses CNT_CLK from the time t4 to the time t6 is a digital signal obtained by summing the 2AN1 signal and the AN2−AN1 signal, that is, a digital signal based on the sum of the AN1 signal and the AN2 signal (hereinafter referred to as an "AN1+AN2 signal". The digital signal held by the counter 11-1 at the time t6 is referred to as a "DN1+DN2 signal"

At a time t7, the pulse CMOD1(0) is switched to the L level.

At a time t12, the pulse CMOD1(1) is switched to the H level, and the counter 11-1 enters the double count mode. In addition, the pulse CMOD1(0) is switched to the L level, and the pulse CEN1 is switched to the H level. In this manner, the counter 11-1 counts the number of the clock pulses CNT_CLK in a double count mode through up-counting.

If, at a time t13, the greater-lesser relationship between the potential VL1 of the vertical signal line 7-1 and the potential of the ramp signal RMP is reversed, the signal level of the comparison result signal CMP1 is switched to the L level. Thus, the counter control unit 10 switches the pulse CMOD1(1) to the L level. Accordingly, the counter 11-1 enters a single count mode from the double count mode and counts the clock pulse CNT_CLK.

If, at a time t14, the greater-lesser relationship between the potential VL2 of the vertical signal line 7-2 and the potential of the ramp signal RMP is reversed, the signal level of the comparison result signal CMP2 is switched to the L level. Thus, the counter control unit 10 switches the pulse CEN1 to the L level. Accordingly, the counter 11-1 holds the count signal as of that time.

The digital signal held by the counter 11-1 at the time t14 is described next.

The counter 11-1 counts the number of the clock pulses CNT_CLK in the double count mode from the time t12 to the time t13. The signal held by the counter 11-1 at the time t13 is a digital signal based on a signal that is double the AS1 signal (hereinafter referred to as a "2AS1 signal"). The counter 11-1 counts the number of the clock pulses CNT_CLK in the single count mode from the time t13 to the time t14. The digital signal obtained by counting the number of the clock pulses CNT_CLK during only a period from the time t13 to the time t14 is a digital signal based on a signal obtained by subtracting the AS1 signal from the AS2 signal (hereinafter referred to as an AS2−AS1 signal). Accordingly, the digital signal obtained by the counter 11-1 counting the number of the clock pulses CNT_CLK from the time t12 to the time t14 is a digital signal based on a signal obtained by summing the 2AS1 signal and the AS2−AS1 signal, that is, a digital signal based on the sum of the AS1 signal and the AS2 signal (hereinafter referred to as an "AS1+AS2 signal"). The digital signal held by the counter 11-1 at the time t14 is referred to as a "DS'1+DS'2 signal". Like the counter 11-2, during a period of time during which the signal values of the comparison result signals CMP1 and CMP2 (the L level) differ from the signal values thereof when the comparators 8-1 and 8-2 start the comparison operation (H level), the counter 11-1 stops counting the number of clock pulses. In this manner, the counter 11-1 continues to hold the DS'1+DS'2 signal.

At a time t15, a pulse CMOD2(1) is switched to the L level.

In the image pickup apparatus, the counter 11-1 serving as a second counter is operated in the double count mode and the single count mode. That is, the counter 11-1 performs a first counting operation when the signal values of the comparison result signals of the plurality of comparators are the same and performs a second counting operation when the signal values of the comparison result signals of the plurality of comparators differ from one another. In addition, the number of counting the clock pulse per unit time in the first counting operation is increased from the number of counting the clock pulse per unit time in the second counting operation. In this manner, the DS'1+DS'2 signal and the |DS'1−DS'2| signal can be obtained. Note that a first digital signal according to the present exemplary embodiment is the |DS'1−DS'2| signal. In addition, a second digital signal according to the present exemplary embodiment is the DS'1+DS'2 signal. That is, the first digital signal based on a difference between the signals output from the pixels 100 and the second digital signal based on the sum of the signals output from the pixels 100 can be obtained.

Case (2) of Greater-Lesser Relationship Between Signal Amplitudes

The operation performed when, in terms of the signal amplitude, AN1 signal>AN2 signal, and AS1 signal>AS2 signal is described below.

Figure 4:
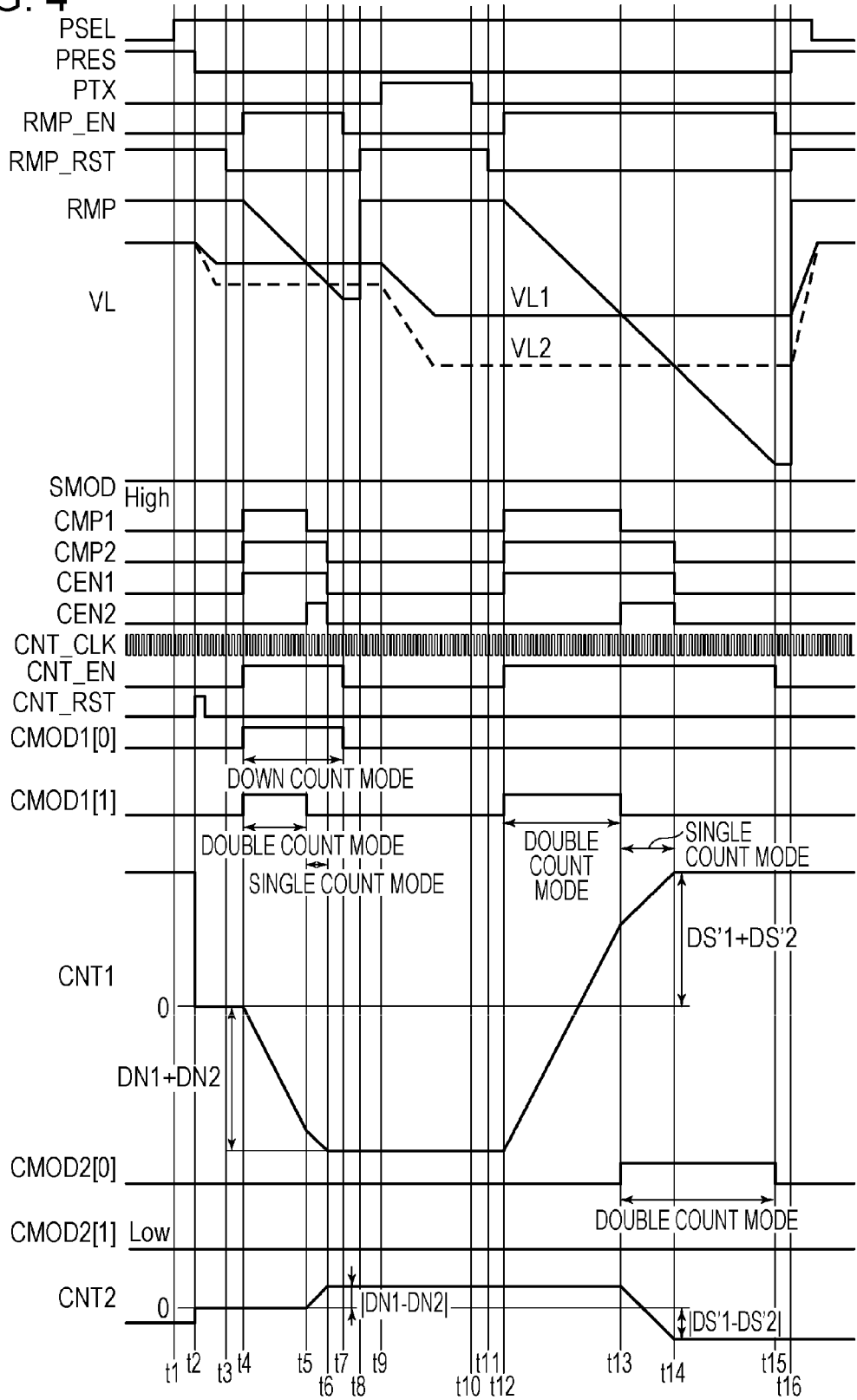
FIG. 4 is a timing diagram illustrating an example of the operation performed by the image pickup apparatus.
Figure 5:
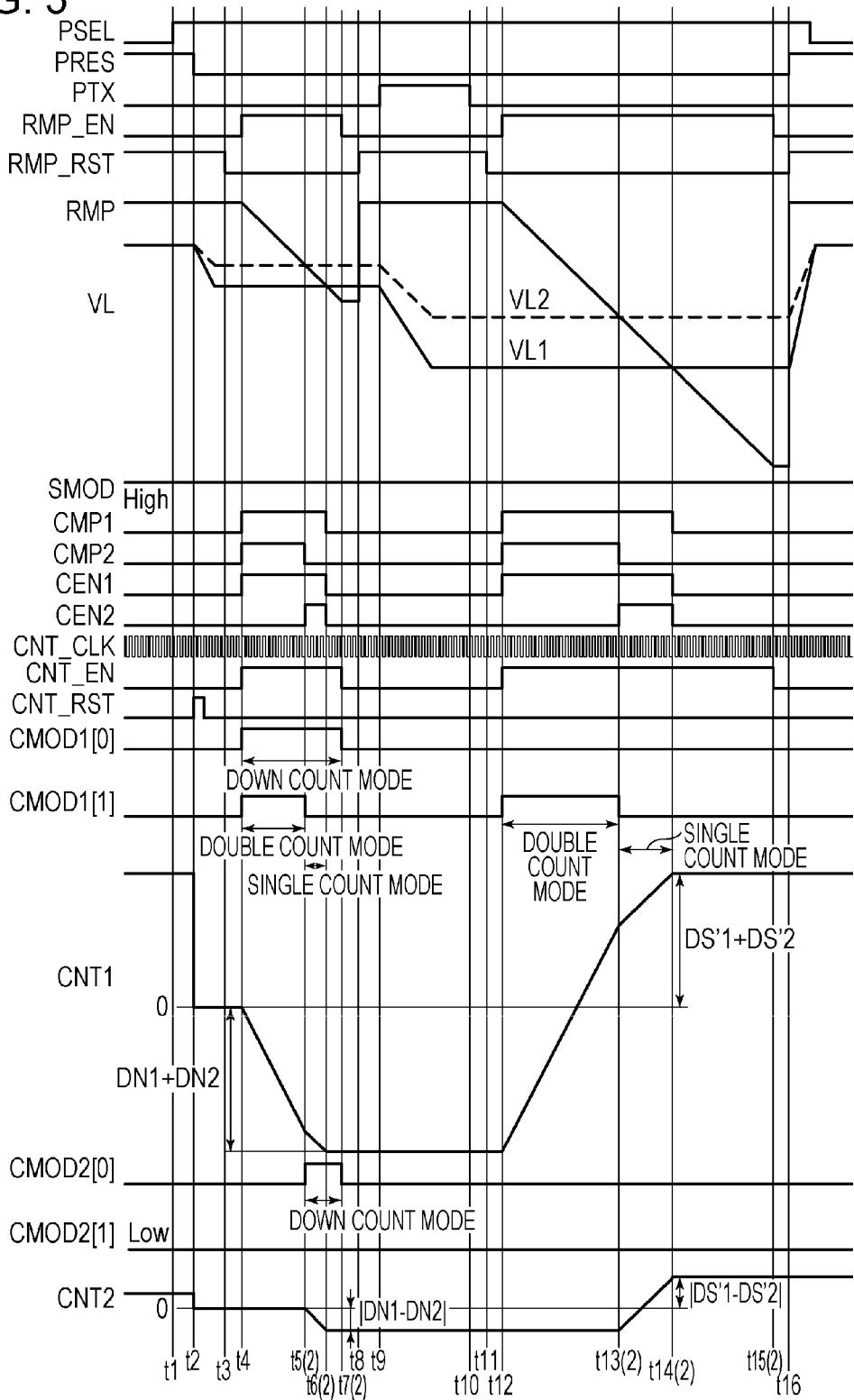
FIG. 5 is a timing diagram illustrating another example of the operation performed by the image pickup apparatus.

The following description is made with reference to FIG. 5. The differences from the operation illustrated in FIG. 4 are mainly described.

The operations performed from the time t1 to the time t4 can be the same as those performed from the time t1 to the time t4 illustrated in FIG. 4.

If, at a time t5(2), the greater-lesser relationship between the potential VL2 of the vertical signal line 7-2 and the potential of the ramp signal RMP is reversed, the signal level of the comparison result signal CMP2 is switched to the L level.

If the comparison result signals CMP1 and CMP2 have different signal values, the counter control unit 10 switches the pulse CEN2 to the H level. Accordingly, the counter control unit 10 switches the pulse CEN2 to the H level at the time t5(2). While the comparison result signal CMP2 is at the L level, the pulse CEN2 is at the H level. The pulse CNT_EN is also switched to the H level, and the counter 11-2 starts counting the number of the clock pulses CNT_CLK. The counter control unit 10 switches the pulse CMOD2(0) to the H level. In this manner, the counter 11-2 counts the number of the clock pulses CNT_CLK through down-counting.

If, at a time t6(2), the greater-lesser relationship between the potential VL1 of the vertical signal line 7-1 and the potential of the ramp signal RMP is reversed, the signal level of the comparison result signal CMP1 is switched to the L level. Accordingly, the counter control unit 10 switches the pulses CEN1 and CEN2 to the L level. Thus, the counters 11-1 and 11-2 hold the count values as of that time. The count signal held by the counter 11-1 is the DN1+DN2 signal. The count signal held by the counter 11-2 is the |DN1−DN2| signal.

At a time t7(2), the timing generator switches the pulse RMP_EN to the L level. In addition, the timing generator switches the pulse CNT_EN to the L level. Furthermore, the counter control unit 10 switches the pulses CMOD1(0) and CMOD2(0) to the L level.

The operations performed from the time t8 to the time t12 can be the same as those performed from the time t8 to the time t12 illustrated in FIG. 4.

If, at a time t13(2), the greater-lesser relationship between the potential VL2 of the vertical signal line 7-2 and the potential of the ramp signal RMP is reversed, the signal level of the comparison result signal CMP2 is switched to the L level. Accordingly, the counter control unit 10 switches the pulse CEN2 to the H level. Since the pulse CNT_EN is also at the H level, the counter 11-2 starts counting the number of the clock pulses CNT_CLK. The counter control unit 10 switches the pulse CMOD2(0) to the L level, and the counter 11-2 counts the number of the clock pulses CNT_CLK through up-counting.

If, at a time t14(2), the greater-lesser relationship between the potential VL1 of the vertical signal line 7-1 and the potential of the ramp signal RMP is reversed, the signal level of the comparison result signal CMP1 is switched to the L level. Accordingly, the counter control unit 10 switches the pulses CEN1 and CEN2 to the L level. Thus, the counters 11-1 and 11-2 hold the count signals as of that time. The count signal held by the counter 11-1 at that time is the DS'1+DS'2 signal, and the count signal held by the counter 11-2 at that time is the |DS'1−D'2| signal.

The operations performed at the time t15 and the time t16 can be the same as those performed at the time t15 and the time t16 illustrated in FIG. 4.

Through the above-described operations, the DS'1+DS'2 signal and the |DS'1−DS'2| signal can be obtained.

Case (3) of Greater-Lesser Relationship Between Signal Amplitudes

The operation performed when, in terms of the signal amplitude, AN1 signal>AN2 signal, and AS1 signal<AS2 signal is described below.

Figure 6:
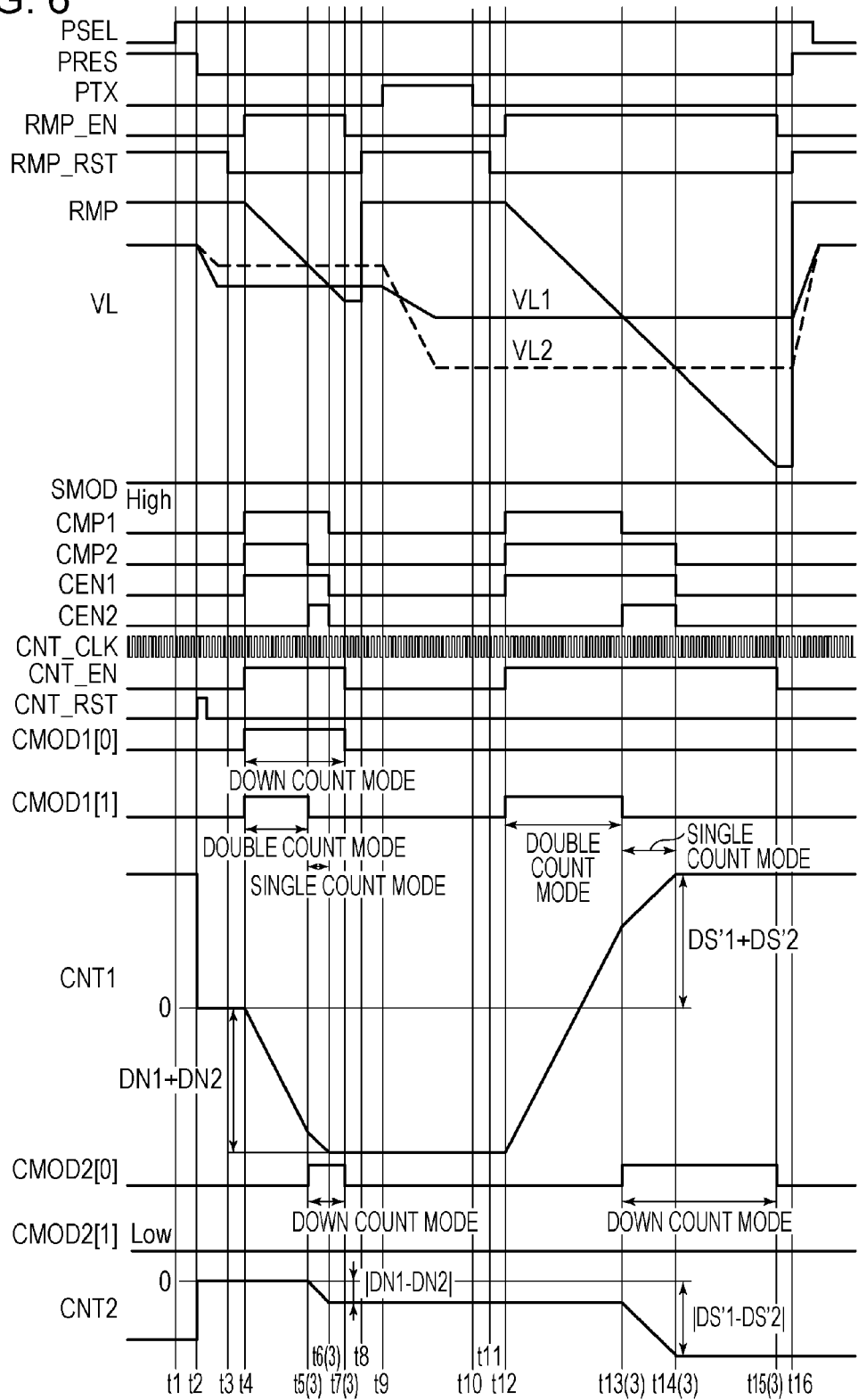
FIG. 6 is a timing diagram illustrating another example of the operation performed by the image pickup apparatus.

The following description is made with reference to FIG. 6.

The operations performed from the time t1 to the time t4 can be the same as those performed from the time t1 to the time t4 illustrated in FIG. 4.

The operations performed at times t5(3), t6(3), and t7(3) can be the same as those performed at the time t5(2), t6(2), and t7(2) illustrated in FIG. 5, respectively.

The operations performed from the time t8 to the time t12 can be the same as those performed at the time t1 to the time t4 illustrated in FIG. 4, respectively.

The operations performed at times t13(3), t14(3), and t15 (3) can be the same as those performed at the time t13, t14, and t15 illustrated in FIG. 4, respectively.

The operations performed at a time t16 can be the same as that performed at the time t16 illustrated in FIG. 4.

Through the above-described operations, the DS'1+DS'2 signal and the |DS'1−DS'2| signal can be obtained.

Case (4) of Greater-Lesser Relationship Between Signal Amplitudes

The operation performed when, in terms of the signal amplitude, AN1 signal<AN2 signal, and AS1 signal>AS2 signal is described below.

Figure 7:
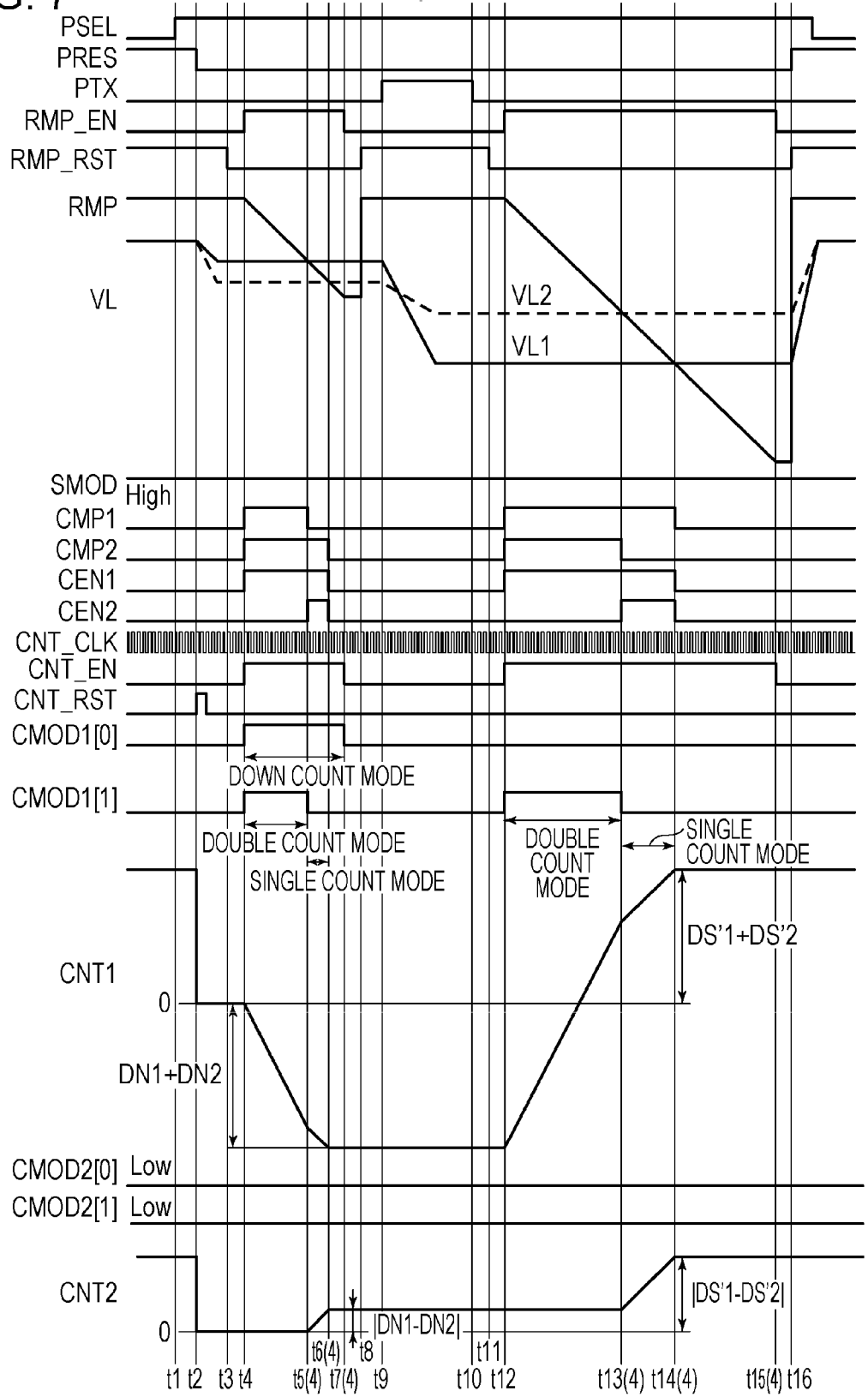
FIG. 7 is a timing diagram illustrating another example of the operation performed by the image pickup apparatus.

The following description is made with reference to FIG. 7.

The operations performed from the time t1 to the time t4 can be the same as those performed from the time t1 to the time t4 illustrated in FIG. 4.

The operations performed at times t5(4), t6(4), and t7(4) can be the same as those performed at the time t5, t6, t7 illustrated in FIG. 4, respectively.

The operations performed from a time t8 to a time t12 can be the same as those performed at the time t1 to the time t4 illustrated in FIG. 4, respectively.

The operations performed at times t13(4), t14(4), and t15 (4) can be the same as those performed at the time t13(2), t14(2), and t15(2) illustrated in FIG. 5, respectively.

The operations performed at a time t16 can be the same as that performed at the time t16 illustrated in FIG. 4.

Through the above-described operations, the DS'1+DS'2 signal and the |DS'1−DS'2| signal can be obtained.

According to the present exemplary embodiment, the image pickup apparatus includes the counter control unit 10 that selects one of up-counting and down-counting of the signal value of the count signal for a counter in accordance with the order in which the signal values of the comparison result signals CMP1 and CMP2 vary during a period of time during which the signal values of the comparison result signals CMP1 and CMP2 differs from each other. Thereafter, the counter control unit 10 causes the counter to count the number of clock pulses. As described above, the counter control unit 10 sets the signal value of the pulse CMOD2(0) in the N conversion period and the S conversion period based on the greater-lesser relationship among the signal amplitudes of a plurality of pixels. Thus, in each of the cases (1) to (4) of the signal amplitude relationship, the |DS'1−DS'2| signal can be obtained without providing a period during which the reference potentials of the comparators 8 differ from one another.

In addition, according to the present exemplary embodiment, for the counter 11-1, the counter control unit 10 sets the weight of counting of the number of clock pulses given during a period during which the signal values of the comparison result signals output from the plurality of comparators are the same to greater than that during which the signal values of the comparison result signals output from the plurality of comparators differ from one another. In this manner, the counter 11-1 generates a count signal based on the sum of the pixel signal output from the pixel 100-1 and the pixel signal output from the pixel 100-2.

The present exemplary embodiment has been described with reference to a technique for obtaining a digital signal based on the sum of the pixel signals output from the pixels 100-1 and 100-2 and a digital signal based on the difference between the pixel signals output from the pixels 100-1 and 100-2. However, the sum of the pixel signals output from the pixels other than the pixels 100-1 and 100-2 may be employed, and the difference between the pixel signals output from pixels other than the pixels 100-1 and 100-2 may be employed. That is, various combinations of the pixels can be employed. For example, a digital signal based on the sum of pixel signals output from the pixels 100-1 and 100-3 and the difference between the pixel signals output from the pixels 100-1 and 100-3 may be obtained based on the comparison result signals CMP1 and CMP3 output from the comparators 8-1 and 8-3.

While the present exemplary embodiment has been described with reference to the potential of the ramp signal that gradually varies in a time-dependent manner, the variation of the potential of the ramp signal is not limited thereto. For example, the potential of the ramp signal may vary in a stepwise fashion in a time-dependent manner. An example of such a ramp signal is a signal generated by a digital-to-analog converter that includes a resistor array and that sequentially switches the resistance.

In addition, while the present exemplary embodiment has been described with reference to the image pickup apparatus in which a pixel signal is output from the pixel 100 to the comparator 8, the following different configuration may be employed. That is, the image pickup device may have a capacitance on the vertical signal line 7. A pixel signal may be output from the pixel to one electrode of the capacitance, and the other electrode of the capacitance may be electrically connected to the input terminal of the comparator 8. By using the capacitance, correlated double sampling may be performed. That is, after causing the capacitance to hold the AN signal, the pixel 100 outputs the AS signal to the vertical signal line 7. Thus, a difference signal between the AS signal and the AN signal is input to the comparator 8. Even such a configuration allows the performance of the operations illustrated in FIGS. 4 to 6 according to the present exemplary embodiment. The |DN1−DN2| signal obtained through the N conversion in this configuration includes components of variations of the comparators 8-1 to 8-4. At that time, the signal output to the comparator 8 is a signal based on the signal output from the pixel 100.

An example of the utilization form of the image pickup apparatus according to the present exemplary embodiment is described next with reference to FIG. 13.

Figure 13:
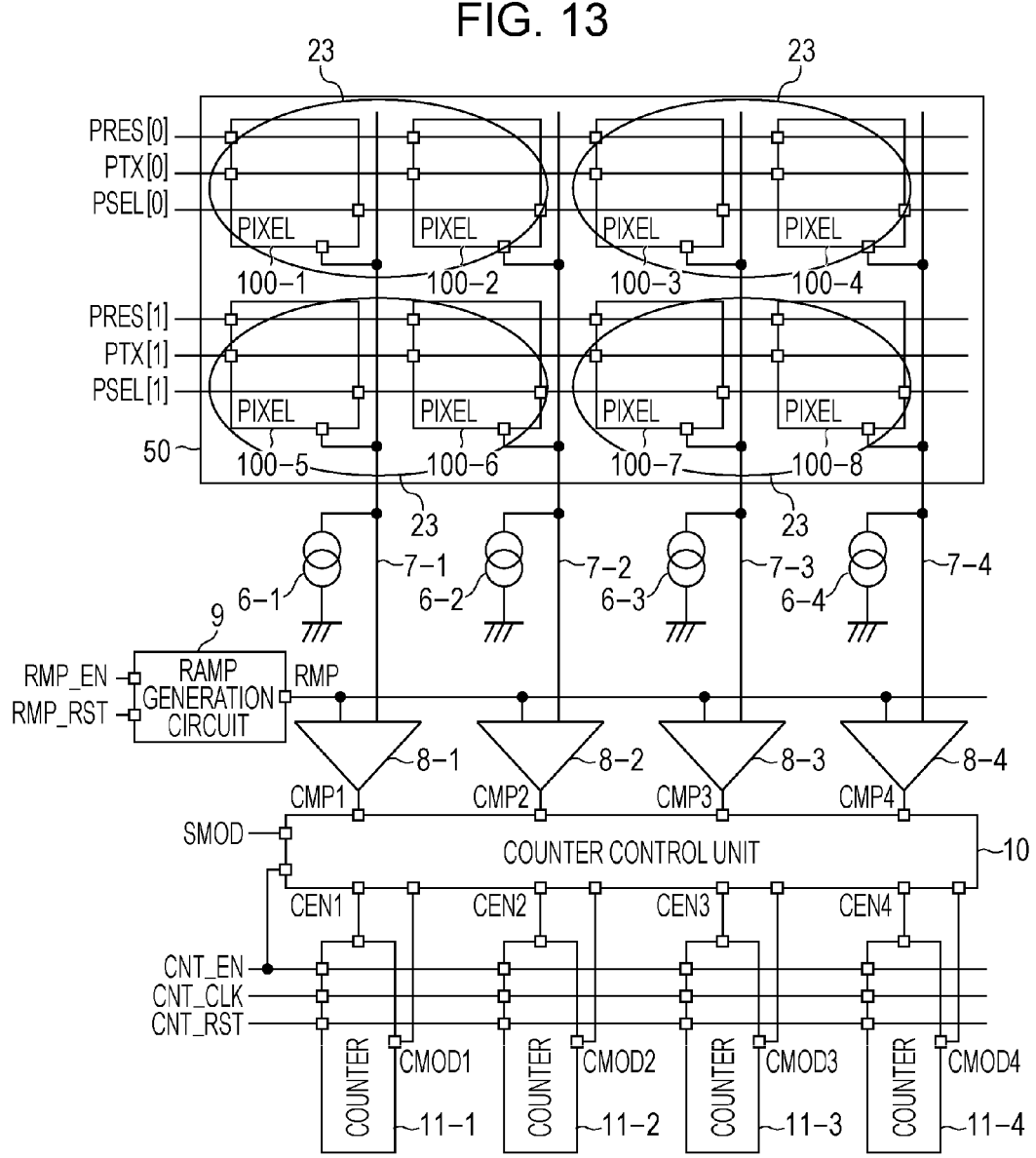
FIG. 13 is a block diagram of another example of the image pickup apparatus.

FIG. 13 illustrates an example of the layout of the pixels 100 illustrated in FIG. 1 and microlenses 23 that collects light onto the photodiodes 1. Each of the microlenses 23 is disposed so as to cover the photodiodes 1 of the pixels 100 in order to direct incident light to the photodiodes 1 of the pixels 100. That is, one of the microlenses is disposed so as to correspond to a plurality of photoelectric conversion units. According to the present exemplary embodiment, the image pickup apparatus includes a microlens array having a plurality of the microlenses 23.

The pixel 100 included in the image pickup apparatus according to the present exemplary embodiment outputs a signal used for focus detection of a phase difference detection scheme. Hereinafter, a signal output from the pixel 100 and used for focus detection is referred to as a "focus detection base signal". For example, among a plurality of pixels of the pixel unit, pixels arranged in a line or a cross output the focus detection base signals. In the image pickup apparatus according to the present exemplary embodiment, the AS1 signal and AS2 signal serve as the focus detection base signals. The image pickup apparatus according to the present exemplary embodiment can detect the incident-light phase difference between the pixels 100-1 and 100-2 using the |DS'1−DS'2| signal. In addition, the image pickup apparatus according to the present exemplary embodiment can obtain a digital signal based on the incident light collected by one of the microlenses 23 using the DS'1+DS'2 signal. That is, the image pickup apparatus can perform focus detection based on the phase difference using the |DS'1−DS'2| signal and image formation using the DS'1+DS'2 signal. The image pickup apparatus according to the present exemplary embodiment can output the |DS'1−DS'2| signal used for focus detection and the DS'1+DS'2 signal used for image formation at the same time.

Furthermore, an image pickup system including an image pickup apparatus and an output signal processing unit that processes a signal output from the image pickup apparatus can be provided. If the image pickup apparatus separately outputs the DS'1 signal and the DS'2 signal, the output signal processing unit disposed outside the image pickup apparatus is to perform arithmetic processing in order to obtain the DS'1−DS'2 signal and the DS'1+DS'2 signal. In contrast, according to the present exemplary embodiment, the image pickup apparatus can reduce the load of the arithmetic processing performed by the output signal processing unit, since the image pickup apparatus outputs the |DS=1−DS'2| signal and the DS'1+DS'2 signal. As a result, the operation performed by an image pickup system including the image pickup apparatus and a signal processing unit can be sped up.

While the present exemplary embodiment has been described with reference to an image pickup apparatus including column ADCs each having the comparator 8 for one of the columns of the pixels 100, the configuration of the image pickup apparatus is not limited thereto. For example, one of the comparators 8 may be provided for two columns of pixels. In addition, application of the present exemplary embodiment is not limited to an image pickup apparatus including a column ADC. For example, the present exemplary embodiment is applicable to image pickup apparatuses having the following configuration. That is, capacitance that holds an analog signal output from the pixels 100 is provided for each of the columns. The horizontal scanning circuit sequentially outputs the analog signals held in the capacitances of the columns. The image pickup apparatus includes an AD conversion unit that converts the analog signal output from the horizontal scanning circuit into a digital signal. At that time, it is only required that the AD conversion unit include the first comparator, the second comparator, a counter control unit, and a counter.

While the present exemplary embodiment has been described with reference to the second counter that operates in the double count mode and the single count mode, the present exemplary embodiment is not limited thereto. For example, when a digital signal based on the sum of the signals output from three pixels 100-1 to 100-3 is obtained, the following configuration can be employed. That is, weighting is performed as follows. If the comparison result signals CMP1 to CMP3 are all at the H level, a single clock pulse CNT_CLK is counted three times. However, if any two of the comparison result signals CMP1 to CMP3 are at the H level, a single clock pulse CNT_CLK is counted two times. If only one of the comparison result signals CMP1 to CMP3 is at the H level, a single clock pulse CNT_CLK is counted once.

The present exemplary embodiment has been described with reference to the second counter that operates the double count mode and the single count mode in order to obtain the DN1+DN2 signal and the DS1+DS2 signal. In order to obtain a second digital signal based on the sum of the first photoelectric conversion signal and the second photoelectric conversion signal, the following configuration can be employed in addition to the above-described configuration. For example, the second counter holds each of a count signal A obtained through counting only when the comparison result signals CMP1 and CMP2 have the same signal value and a count signal B obtained through counting only when the comparison result signals CMP1 and CMP2 have different signal values. In the configuration illustrated in FIG. 4, the count signal A is a DS1−DN1 signal representing the difference between a DN1 signal obtained in down-counting from the time t4 to the time t5 and a DS1 signal obtained in up-counting from the time t12 to the time t13. The count signal B is a signal representing the difference between a DN2−DN1 signal obtained in down-counting from the time t5 to the time t6 and a DS2−DS1 signal obtained in up-counting from the time t13 to the time t14. That is, the count signal B is a DS2−DS1−(DN2−DN1) signal. The second counter outputs the count signal A and the count signal B to a digital signal processing circuit (not illustrated) provided in the image pickup apparatus. The digital signal processing circuit multiplies the count signal A by a value that is double the gain and, subsequently, adds the count signal B to the resultant value. Accordingly, 2DS1−2DN1+DS2−DS1−(DN2−DN1) =DS1−DN1+DS2−DN2. Since the DS1−DN1 signal is the DS'1 signal and the DS2−DN2 signal is the DS'2 signal, the DS'1+DS'2 signal can be obtained.

While the present exemplary embodiment has been described with reference to the configuration having the N conversion period and the S conversion period, the present exemplary embodiment is not limited thereto. For example, the need for the N conversion period may be eliminated, and only the S conversion period may be employed. In such a configuration, the following signals are output from the image pickup apparatus: a |DS1−DS2| signal including the |DN1−DN2| signal and a DS1+DS2 signal including the DN1+DN2 signal.

While the present exemplary embodiment has been described with reference to the image pickup apparatus including the analog-to-digital conversion unit that compares the reference signal having a potential that varies in a time-dependent manner with the pixel signal output from a pixel, an analog-to-digital conversion unit having another configuration can be employed. For example, the analog-to-digital conversion unit may be of a successive approximation type or a delta sigma type. Such an analog-to-digital conversion unit includes a memory that separately stores the DS1 signal and the DS2 signal obtained through AD conversion. In addition, the image pickup apparatus includes a computing unit. The computing unit sums the DS1 signal and the DS2 signal stored in the memory and obtains the DS1+DS2 signal. Furthermore, the computing unit obtains a DS1−DS2 signal which is a difference between the DS1 signal and the DS2 signal. In this manner, the image pickup apparatus can output the DS1+DS2 signal and the DS1−DS2 signal. As a result, the image pickup apparatus can provide the same benefits as those of the image pickup apparatus illustrated in FIGS. 1 to 7 and FIG. 13.

Second Exemplary Embodiment

The image pickup apparatus according to the present exemplary embodiment is described below. In particular, the configuration that differs from that of the first exemplary embodiment is mainly described.

The description is made with reference to the accompanying drawings.

Figure 8:
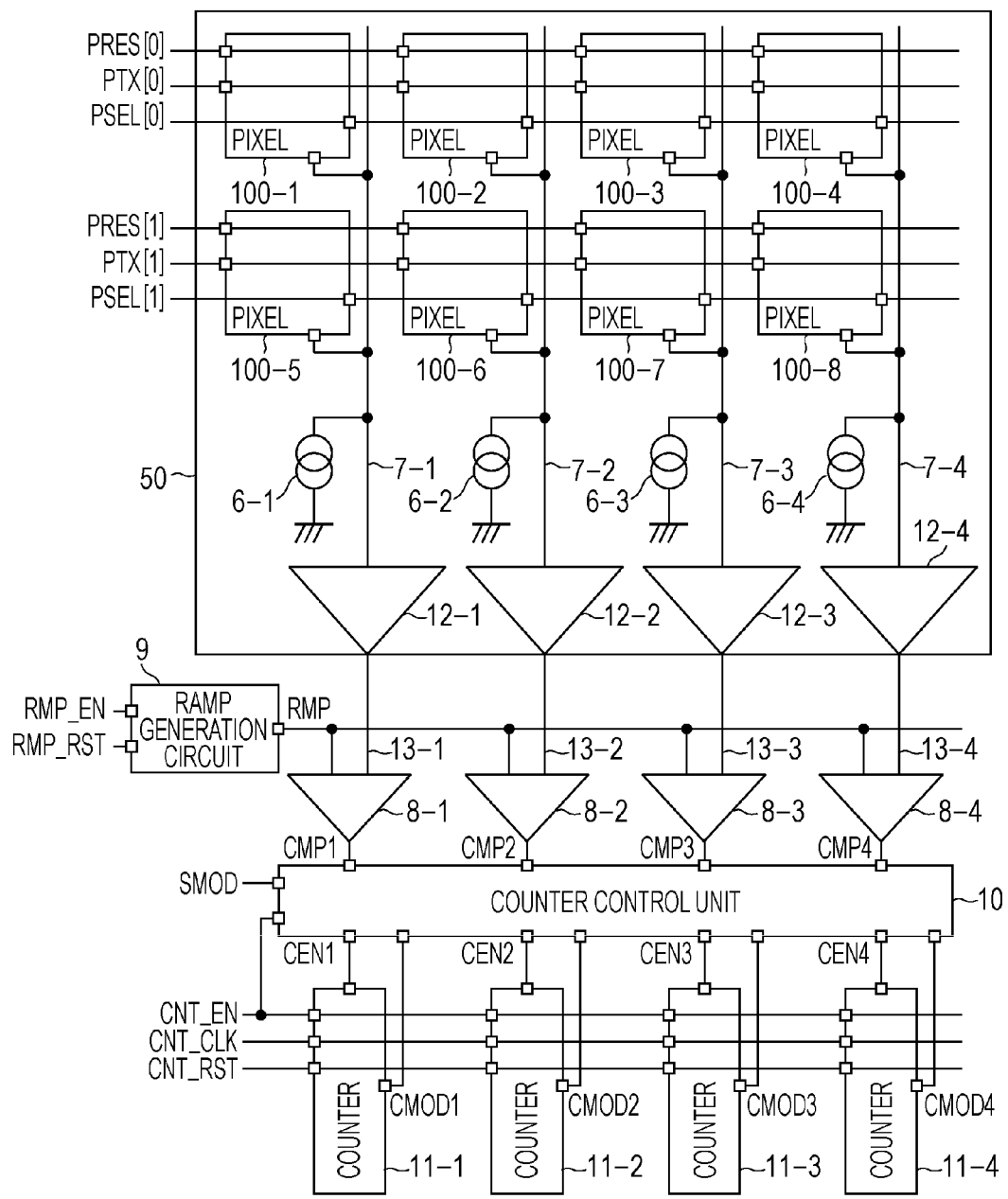
FIG. 8 is a block diagram of another example of the image pickup apparatus.

FIG. 8 is a block diagram of an example of the image pickup apparatus according to the present exemplary embodiment. In FIG. 8, the same reference symbols are used for elements which perform the same functions as in FIG. 1 of the first exemplary embodiment.

A plurality of inverting amplifiers 12 are provided so that each corresponds to a column of the pixels 100 arranged in a matrix. Each of the inverting amplifiers 12 serves as an amplifying unit that amplifies the pixel signals output from the pixels 100 and outputs the amplified pixel signal to the comparator 8. Unlike the first exemplary embodiment, each of the AN signal and AS signal output from the pixel 100 is inverted and amplified by the inverting amplifier 12 and is output to the comparator 8. In terms of the vertical signal lines, an electrical path from the pixel 100 to the inverting amplifier 12 is defined as first vertical signal lines 7-1 to 7-4, and an electrical path from the inverting amplifier 12 to the comparator 8 is defined as inverting amplifier signal lines 13-1 to 13-4. According to the present exemplary embodiment, a signal output from the inverting amplifier 12 is provided to the comparator 8 based on the AN signal output from the pixel 100. The signal output from the inverting amplifier 12 based on the AN signal output from the pixel 100 is referred to as a "GN signal". In addition, the signal output from the inverting amplifier 12 based on the AS signal output from the pixel 100 is referred to as a "GS signal". According to the present exemplary embodiment, the analog signal output unit 50 includes the pixels 100 and the inverting amplifiers 12. According to the present exemplary embodiment, noise signal output from the analog signal output unit 50 is the GN signal. The GN signal includes a noise component of the pixel 100 and an offset component of the inverting amplifier 12. That is, the GN signal is a signal based on the AN signal output from the pixel 100. In addition, a photoelectric conversion signal output from the analog signal output unit 50 is the GS signal. The GS signal is a signal based on the AS signal of the photoelectric conversion signal output from the pixel 100.

Figure 9:
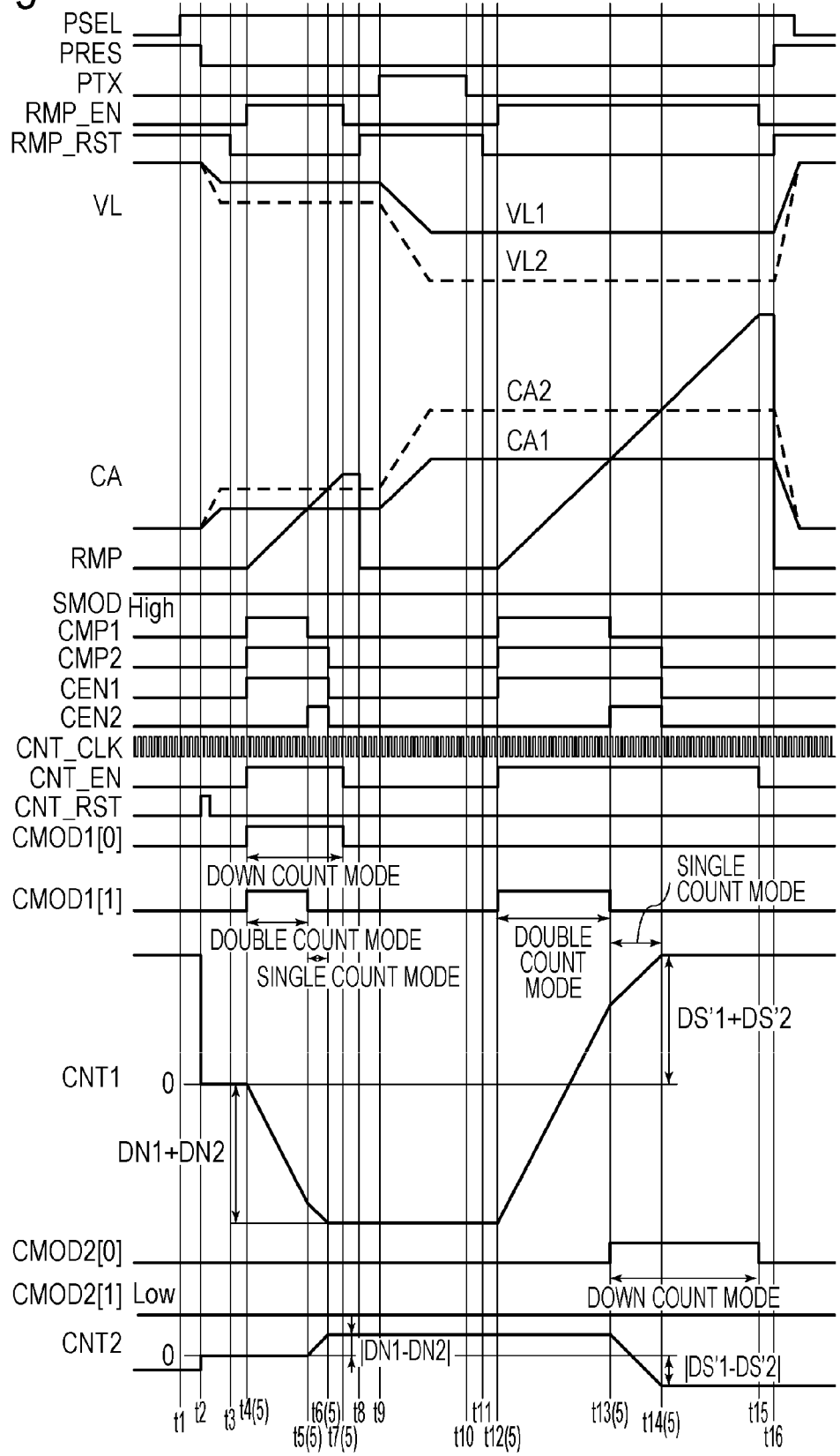
FIG. 9 is a timing diagram illustrating another example of the operation performed by the image pickup apparatus.

FIG. 9 is a timing diagram illustrating an example of the operation performed by the image pickup apparatus illustrated in FIG. 8. FIG. 9 illustrates a potential CA of an inverting amplifier signal line 13, which is an electrical path from the inverting amplifiers 12 to the comparator 8, in addition to a potential VL of the first vertical signal line 7. In addition, FIG. 9 illustrates the signal amplitude case (1) of the first exemplary embodiment illustrated in FIG. 4, where the AN1 signal<the AN2 signal, and the AS1 signal<the AS2 signal, that is, the signal amplitude case where the GN1 signal<the GN2 signal, and the GS1 signal<the GS2 signal. The signal amplitude of each of the DN signal and the GS signal represents the amount of change from the signal output from the inverting amplifier 12 when the pixel 100 does not output a signal.

The potential CA of the inverting amplifier signal line 13 is a signal obtained by inverting and amplifying the potential VL of the vertical signal line 7. Thus, according to the present exemplary embodiment, when the AN signal and the AS signal are output from the pixel 100, the potential CA of the inverting amplifier signal line 13 varies in a direction opposite to the direction in which the potential VL of the first vertical signal line 7 varies. Accordingly, the direction in which the potential of the ramp signal RMP varies in a time-dependent manner is opposite to the direction in the first exemplary embodiment.

The other operations can be the same as those of the first exemplary embodiment illustrated in FIG. 4.

In addition, even in the cases (2) to (4) of the greater-lesser relationship between the signal amplitudes of the pixel signals output from the pixels 100-1 and 100-2 described in the first exemplary embodiment, the present exemplary embodiment is applicable. That is, except that the direction in which the potential of the ramp signal RMP varies in a time-dependent manner is opposite to that in the first exemplary embodiment, the operations can be similar to those illustrated in FIGS. 5 to 7 according to the first exemplary embodiment. Through the above-described operations, the |DS'1−DS'2| signal representing the first digital signal and the DS'1+DS'2 signal representing the second signal can be obtained. As a result, a benefit that is the same as that in the first exemplary embodiment can be provided.

Third Exemplary Embodiment

The image pickup apparatus according to the present exemplary embodiment is described below. In particular, the configurations that differ from those of the first exemplary embodiment are mainly described.

The description is made with reference to the accompanying drawings.

Figure 10:
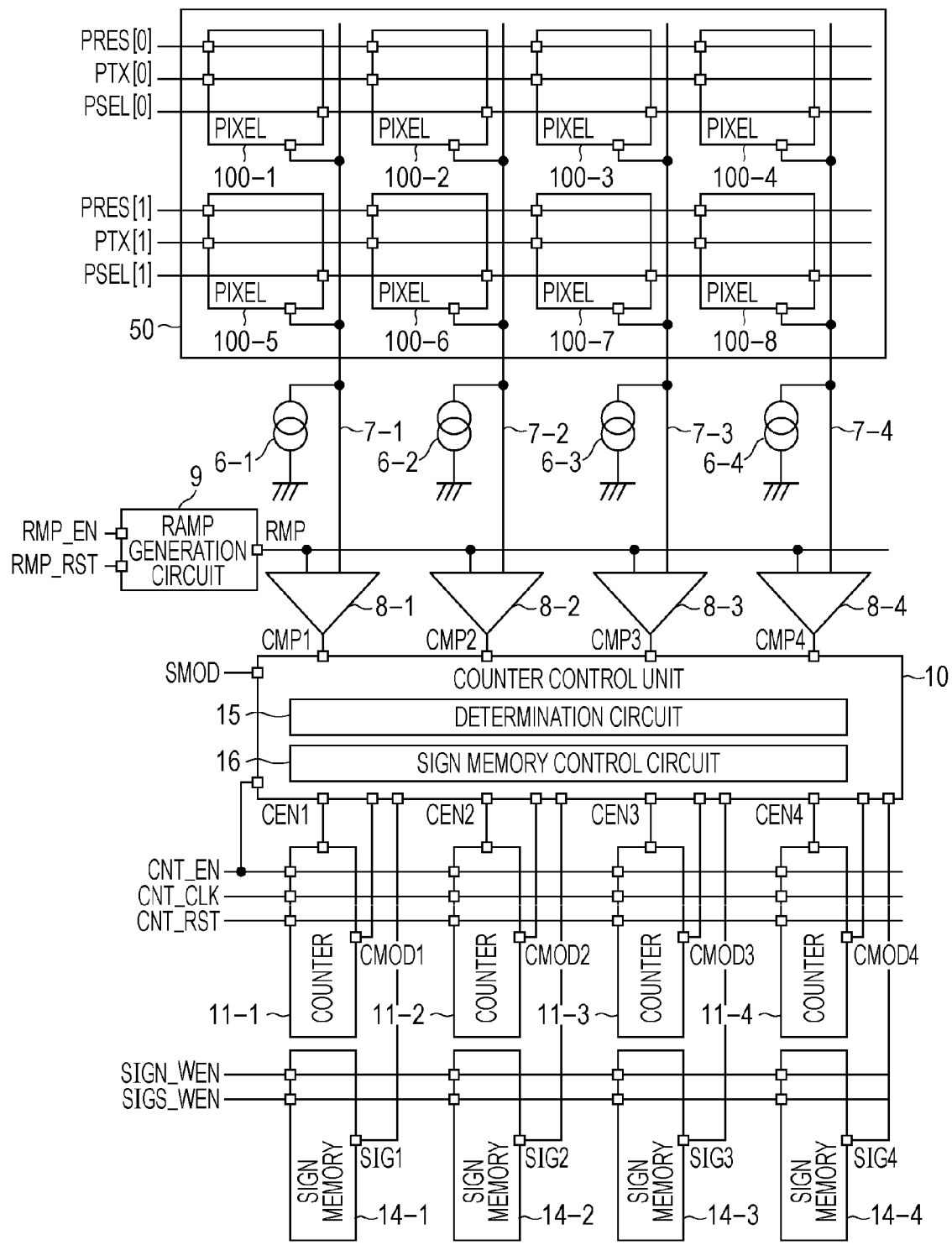
FIG. 10 is a block diagram of another example of the image pickup apparatus.

FIG. 10 is an equivalent circuit diagram of an example of an image pickup apparatus according to the present exemplary embodiment. In FIG. 10, the same reference symbols are used for elements which perform the same functions as in FIG. 4 of the first exemplary embodiment.

Unlike the first exemplary embodiment, a sign memory 14 that receives a signal SIG from the counter control unit 10 is provided for each of the counters 11, and the counter control unit 10 additionally includes a determination circuit 15 and a sign memory control circuit 16. As an example of the configuration in which the sign memory 14 is provided for each of the counters 11, a plurality of circuit units each including the sign memory 14 and the counter 11 are provided. The determination circuit 15 serves as a sign determination unit that determines whether the sign of a count signal held by the counter 11 is positive or negative. The sign memories 14-1 to 14-4 illustrated in FIG. 10 receive signals SIG1 to SIG4 from the counter control unit 10, respectively. The signals SIG1 to SIG4 are at the H level if the comparison result signal CMP1 is switched to the L level earlier than the comparison result signal CMP2. In contrast, the signals SIG1 to SIG4 are at the L level if the comparison result signal CMP1 is switched to the L level later than the comparison result signal CMP2. That is, the signals SIG1 to SIG4 are used to cause the sign memory 14 to hold the greater-lesser relationship between the pixel signals output from the pixels 100. The sign memory 14 receives pulses SIGN_WEN and SIGS_WEN from a timing generator (not illustrated).

Figure 11:
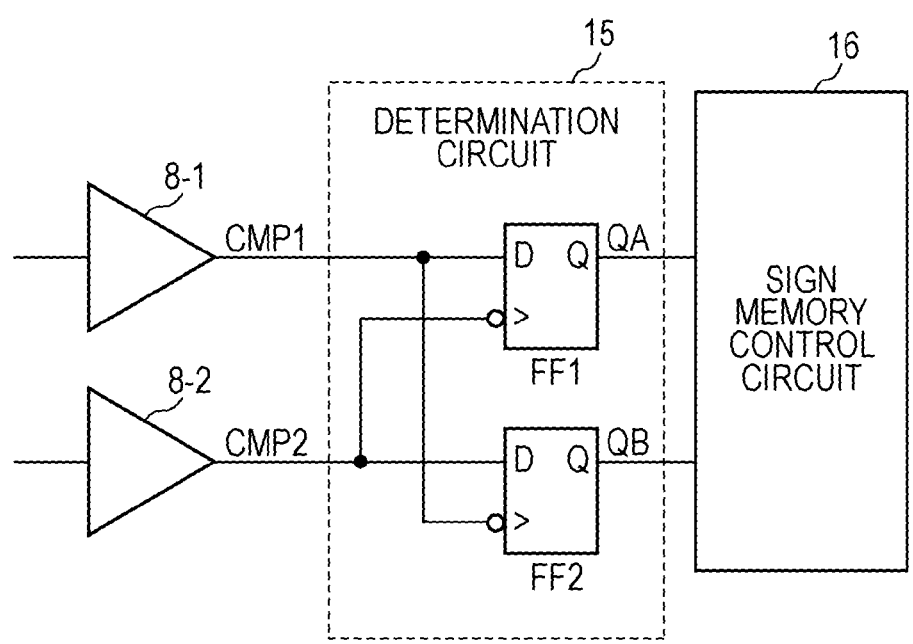
FIG. 11 is a block diagram of an example of a counter control unit of the image pickup apparatus.

The counter control unit 10 according to the present exemplary embodiment is described next with reference to FIG. 11.

The counter control unit 10 includes flip-flop circuits FF1 and FF2. A D terminal of the flip-flop circuit FF1 receives the comparison result signal CMP1 output from the comparator 8-1. A second input terminal of the flip-flop circuit FF1 receives a signal obtained by inverting the comparison result signal CMP2 output from the comparators 8-2. The flip-flop circuit FF1 outputs a signal QA from a Q terminal to the sign memory control circuit 16 based on the signals input to the D terminal and the second input terminal. A D terminal of the flip-flop circuit FF2 receives the comparison result signal CMP2 output from the comparator 8-2. In addition, a second input terminal of the flip-flop circuit FF2 receives a signal obtained by inverting the comparison result signal CMP1 output from the comparators 8-1 instead of the clock pulse CNT_CLK. The flip-flop circuit FF2 outputs a signal QB from a Q terminal to the sign memory control circuit 16 based on the signals input to the D terminal and the second input terminal.

TABLE 2 indicates a relationship between timing at which each of the comparison result signals CMP1 and CMP2 is switched from the H level to the L level and the signal values of the signals QA and QB.

TABLE 2

|  | QA | QB |
|---|---|---|
| CMP1 switched to L level earlier than CMP2 | 0 | 1 |
| CMP2 switched to L level earlier than CMP1 | 1 | 0 |

If the comparison result signals CMP1 and CMP2 are switched from the L level to the H level at the same time, the signal values of the signals QA and QB are the same. Similarly, if both the comparison result signals CMP1 and CMP2 are at the H level and do not switch to the L level, the signal values of the signals QA and QB are the same. That is, in the two cases, the signal values of the signals QA and QB are one of "0", "1", and initial values of the flip-flop circuits FF1 and FF2.

The sign memory control circuit 16 generates the signal SIG based on the signal values of the signals QA and QB. According to the present exemplary embodiment, the image pickup apparatus can use only one of the signals SIG1 and SIG2. A configuration in which the signal SIG1 is fixed to the L level and the signal SIG2 is varied in accordance with the signal values of the signals QA and QB is described next. When the signal value of the signal QA is "1" and if the signal value of the signal QB is "0", the signal value of the signal SIG2 is set to the L level. In contrast, when the signal value of the signal QA is "0" and if the signal value of the signal QB is "1", the signal value of the signal SIG2 is set to the H level. If the signal SIG2 is at the L level, the sign memory 14-2 holds a signal having the L level. When a signal having the L level held by the sign memory 14-2 is output, it can be determined that a signal obtained by subtracting the pixel signal output from the pixels 100-2 from the pixel signal output from the pixels 100-1 is positive. In contrast, if the signal SIG2 is at the H level, the sign memory 14-2 holds a signal having the H level. When a signal having the H level held by the sign memory 14-2 is output, it can be determined that a signal obtained by subtracting the pixel signal output from the pixels 100-2 from the pixel signal output from the pixels 100-1 is negative. If the signal values of the signal QA and QB are either "0" or "1", the signal value of the signal SIG2 may be at the H level or the L level.

Figure 12:
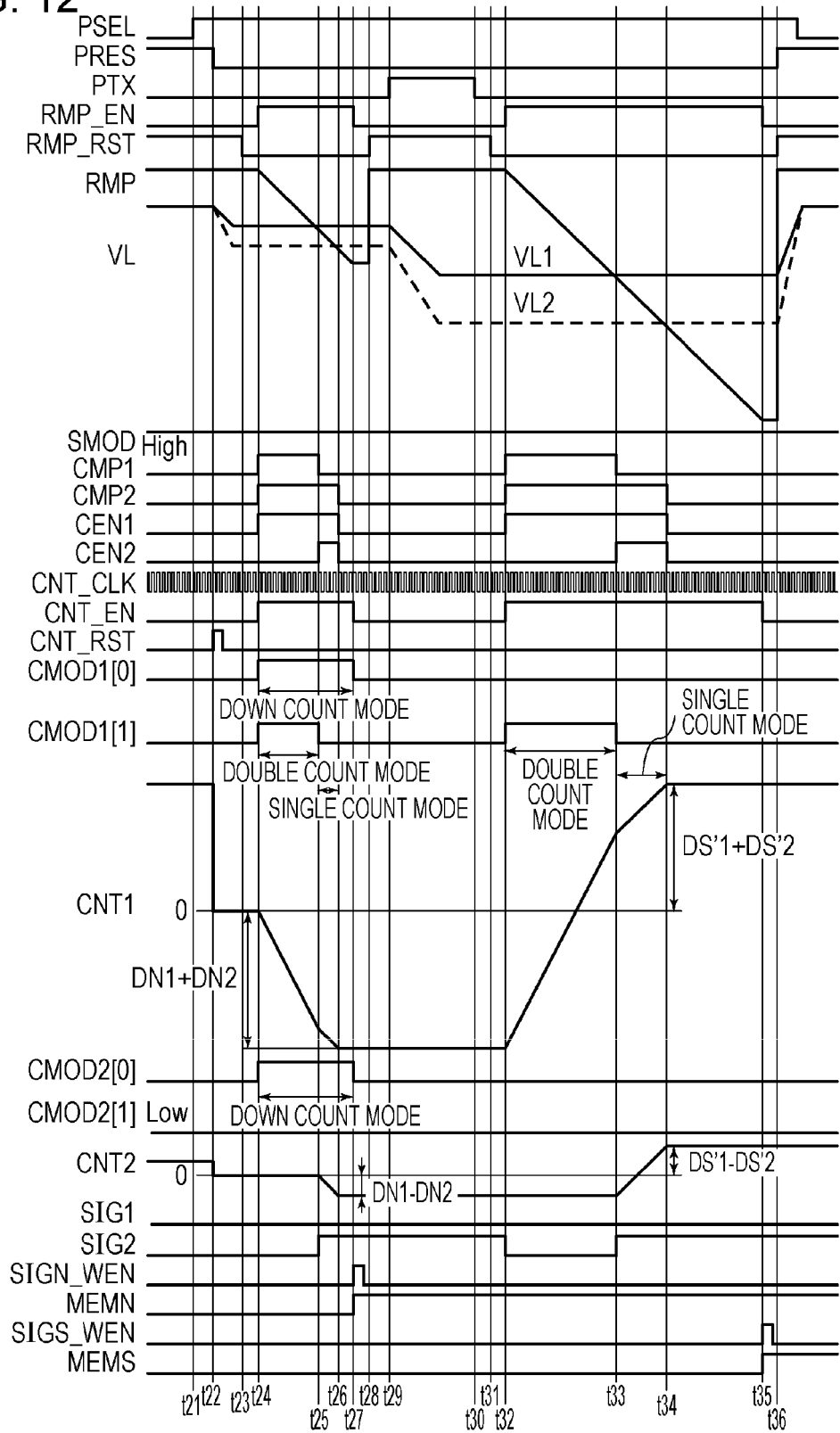
FIG. 12 is a timing diagram illustrating an example of another operation performed by the image pickup apparatus.

The operations that are performed by the image pickup apparatus illustrated in FIG. 10 and that differ from the operations in the first exemplary embodiment are mainly described next with reference to FIG. 12. The reference symbols "MEMN" and "MEMS" in FIG. 12 represent signals held in the sign memory 14. According to the present exemplary embodiment, the sign memory 14-2 holds a signal MEMN, which indicates the sign of an AN1–AN2 signal, and a signal MEMS, which indicates the sign of an AS1–AS2 signal. The operations illustrated in FIG. 12 are performed in a configuration in which the sign memory 14-1 is not used, that is, the signal SIG1 is fixed to the L level. In addition, the operations illustrated in FIG. 12 are performed when the pixel signal output from the pixel 100-1 is smaller than the pixel signal output from the pixel 100-2.

At a time t21, the signals SIG2, SIGN_WEN, SIGS_WEN, MEMN, and MEMS are at the L level. The other operations can be the same as those performed at the time t1 illustrated in FIG. 4 of the first exemplary embodiment.

The operations performed from a time t22 to a time t24 can be the same as those performed from the time t2 to the time t4 illustrated in FIG. 4 of the first exemplary embodiment.

If, at a time t25, the comparison result signal CMP1 is switched to the L level, the signal value of the signal QA is "0" and the signal value of the signal QB is "1" since the comparison result signal CMP2 stays at the H level. Accordingly, the signal SIG2 is switched to the H level. The other operations performed at the time t25 can be the same as those performed at the time t5 illustrated in FIG. 4 of the first exemplary embodiment.

The operations performed at a time t26 can be the same as those performed at the time t6 illustrated in FIG. 4 of the first exemplary embodiment.

At a time t27, the signal SIGN_WEN is switched to the H level. Thus, the sign memory 14-2 keeps the signal value of the signal SIG2, that is, a signal having the H level. Accordingly, the signal MEMN is switched to the H level.

The operations performed from a time t28 to a time t31 can be the same as those performed from the time t8 to the time t11 illustrated in FIG. 4 of the first exemplary embodiment.

At a time t32, the signal SIG2 is reset to the L level. The other operations performed at the time t32 can be the same as those performed at the time t12 illustrated in FIG. 4 of the first exemplary embodiment.

If, at a time t33, the comparison result signal CMP1 is switched to the L level, the signal value of the signal QA is "1" and the signal value of the signal QB is "0" since the comparison result signal CMP2 stays at the H level. Accordingly, the signal SIG2 is switched to the H level. The other operations performed at the time t33 can be the same as those performed at the time t13 illustrated in FIG. 4 of the first exemplary embodiment.

The operations performed at a time t34 can be the same as those performed at the time t14 illustrated in FIG. 4 of the first exemplary embodiment.

At a time t35, the signal SIGS_WEN is switched to the H level. Thus, the sign memory 14-2 keeps the signal value of the signal SIG2, that is, a signal having the H level. Accordingly, the signal MEMS is switched to the H level. The other operations performed at the time t35 can be the same as those performed at the time t15 illustrated in FIG. 4 of the first exemplary embodiment.

The operations performed at a time t36 can be the same as those performed at the time t16 illustrated in FIG. 4 of the first exemplary embodiment.

In the sign memory 14-2, the signals MEMN and MEMS are at the H level. A horizontal scanning circuit (not illustrated) outputs these signals to a signal processing unit disposed outside the image pickup apparatus and electrically connected to the image pickup apparatus. In this manner, the image pickup apparatus can output a signal indicating the greater-lesser relationship between the pixel signals output from the pixels 100-1 and 100-2.

According to the present exemplary embodiment, the image pickup apparatus can obtain the DS'1+DS'2 signal and the DS'1−DS'2 signal. In addition, the image pickup apparatus can obtain the DS'1−DS'2 signal without providing a period of time during which the reference potential of the first comparator differs from that of the second comparator.

The second image pickup apparatus described in Japanese Patent Laid-Open No. 2011-217206 has a third comparator for sign determination and, thus, has a large circuit scale. However, according to the present exemplary embodiment, the image pickup apparatus can determine the sign of the AN1−AN2 signal and the sign of the AS1−AS2 signal while reducing an increase in the circuit scale caused by the presence of a third comparator.

In addition, in the second image pickup apparatus described in Japanese Patent Laid-Open No. 2011-217206, the comparison result of the third comparator for sign determination is input to a determination circuit. Thereafter, based on the determination signal output from the determination circuit, a complement control circuit determines whether the two's complement of a count signal based on the difference between the analog signals output from a first pixel and a second pixel is to be obtained. In this manner, the image pickup apparatus obtains a digital signal based on the difference between the analog signals output from a first pixel and a second pixel without using the greater-lesser relationship between the analog signals output from the first and second pixels. However, according to the present exemplary embodiment, since the image pickup apparatus includes the sign determination unit, the image pickup apparatus can obtain the AN1−AN2 signal and the AS1−AS2 signal and the signs thereof. Thus, the image pickup apparatus according to the present exemplary embodiment can obtain a digital signal based on the difference between the analog signals output from the pixels 100-1 and 100-2 without generating the two's complement of the count signal.

While the present exemplary embodiment has been described with reference to the determination circuit 15 including the flip-flop circuits FF1 and FF2 having the second input terminals that receive the inverted comparison result signals CMP1 and CMP2, the configuration of the present exemplary embodiment is not limited thereto. According to the present exemplary embodiment, if the greater-lesser relationship between the ramp signal and the pixel signal is reversed, a comparison result signal of the comparator 8 is switched from the H level to the L level. However, the comparison result signal of a comparator 8 may be switched from the L level to the H level. In such a configuration, the signals input to the second terminals of the flip-flop circuits FF1 and FF2 can be the comparison result signals CMP1 and CMP2.

While the present exemplary embodiment has been described with reference to an example of the determination circuit 15 including the flip-flop circuits FF1 and FF2 (refer to FIG. 11), the configuration of the determination circuit 15 according to the present exemplary embodiment is not limited thereto. For example, instead of employing the determination circuit 15, a logic circuit that can detect which one of the comparison result signal CMP1 and CMP2 changes first can be employed. For example, a D-latch circuit may be employed instead of the flip-flop circuits FF1 and FF2.

Fourth Exemplary Embodiment

Figure 14:
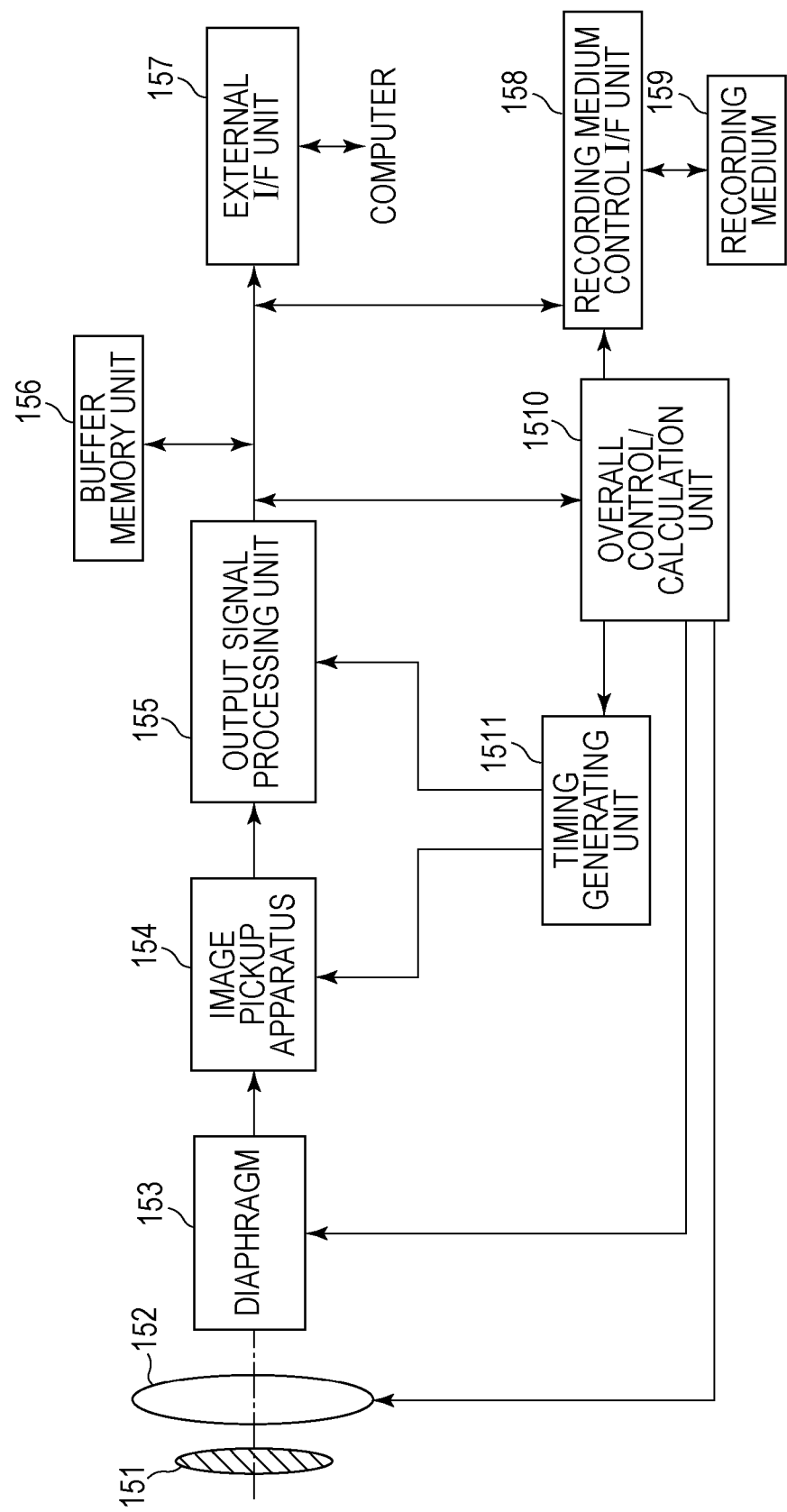
FIG. 14 is a block diagram of an example of an image pickup system.

An image pickup system including the image pickup apparatus according to any one of the first to third exemplary embodiments is described below. Examples of the image pickup system include a digital still camera, a digital camcorder, and a security camera. FIG. 14 is a schematic illustration of a digital still camera including the image pickup apparatus as an example of the image pickup system.

As illustrated in FIG. 14, the image pickup system includes a lens 152 that focuses an optical image of a photographic subject on an image pickup apparatus 154, a barrier 151 that protects the lens 152, and a diaphragm 153 that varies the amount of light passing through the lens 152. The lens 152 and the diaphragm 153 form an optical system that directs light onto the image pickup apparatus 154. The image pickup system further includes an output signal processing unit 155 that processes an output signal output from the image pickup apparatus 154.

The output signal processing unit 155 includes a digital signal processing unit. The output signal processing unit 155 performs a variety of correction and compression processes on a signal output from the image pickup apparatus 154 as needed. Thereafter, the output signal processing unit 155 outputs the processed signal.

In addition, the image pickup system further includes a buffer memory unit 156 for temporarily storing image data and a recording medium control interface (I/F) unit 158 for recording and reading data onto/from a recording medium. The image pickup system further includes a removable recording medium 159, such as a semiconductor memory, for recording and reading captured image data thereonto/therefrom. The image pickup system still further includes an external interface unit 157 for communicating with an external computer, an overall control/calculation unit 1510 that performs a variety of arithmetic operations and overall control of the digital still camera, and the image pickup apparatus 154. The image pickup system yet still further includes a timing generating unit 1511 that outputs a variety of timing signals to the output signal processing unit 155. However, the timing signals may be input from the outside. The image pickup system may include at least the image pickup apparatus 154 and the output signal processing unit 155 that processes an output signal output from the image pickup apparatus 154. Alternatively, in the configuration of the image pickup apparatus illustrated in FIG. 13, the output signal processing unit 155 may process a focus detection signal. In addition, the output signal processing unit 155 may form an image from the DS'1+DS'2 signal.

As described above, according to the present exemplary embodiment, the image pickup system can perform an image capturing operation using the image pickup apparatus 154.

As noted above, the above-described exemplary embodiments can provide the image pickup apparatus that outputs a digital signal based on the difference between the signals output from the pixels and a digital signal based on the sum of the signals output from the pixels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-127388 filed Jun. 4, 2012, which is hereby incorporated by reference herein in its entirety.

What is claimed is:

1. An image pickup apparatus comprising:
   a first pixel and a second pixel each having a photoelectric conversion unit that generates a signal carrier based on incident light; and
   an analog-to-digital conversion unit,
   wherein the first pixel outputs a first photoelectric conversion signal based on the signal carrier,
   and the second pixel outputs a second photoelectric conversion signal based on the signal carrier,
   wherein the analog-to-digital conversion unit includes a first comparator that outputs a first comparison result signal having a signal value obtained by comparing the first photoelectric conversion signal with a reference signal having a potential varying in a time-dependent manner and a second comparator that outputs a second comparison result signal having a signal value obtained by comparing the second photoelectric conversion signal with the reference signal, and
   wherein based on the first comparison result signal and the second comparison result signal, the analog-to-digital conversion unit generates a first digital signal and a second digital signal, the first digital signal is based on a difference between the first photoelectric conversion signal and the second photoelectric conversion signal, and the second digital signal is based on a sum of the first photoelectric conversion signal and the second photoelectric conversion signal,
   wherein the analog-to-digital conversion unit further includes
   first and second counters each generating a count signal having a signal value obtained by counting the number of clock pulses and
   a counter control unit,
   wherein the counter control unit selects one of an increase and a decrease in the signal value of the count signal based on an order in which each of the signal value of the first comparison result signal and the signal value of the second comparison result signal varies,
   wherein the counter control unit causes the first counter to count the number of clock pulses during a period of time during which the signal value of the first comparison result signal differs from the signal value of the second comparison result signal and causes the second counter to generate the count signal through first counting in which the number of clock pulses is counted during a period of time during which the signal value of the first comparison result signal is the same as the signal value of the second comparison result signal and second counting in which the number of clock pulses is counted during a period of time during which the signal value of the first comparison result signal differs from the signal value of the second comparison result signal so that counting of the number of clock pulses per unit time in the first counting is greater than counting of the number of clock pulses per unit time in the second counting, and
   wherein during a period of time during which the signal values of the first comparison result signal and the second comparison result signal differ from the signal values obtained when comparison of the first photoelectric conversion signal and the reference signal performed by the first comparator and comparison of the second photoelectric conversion signal and the reference signal performed by the second comparator start, the counter control unit causes the first counter and the second counter to stop counting the number of clock pulses, causes the first counter to generate the first digital signal, and causes the second counter to generate the second digital signal.

2. The image pickup apparatus according to claim 1, wherein the counter control unit is disposed in each of a path from the first pixel to the first comparator and a path from the second pixel to the second comparator.

3. The image pickup apparatus according to claim 1, wherein each of the first pixel and the second pixel further outputs a noise signal,
   wherein the analog-to-digital conversion unit further includes
   first and second counters each generating a count signal having a signal value obtained by counting the number of clock pulses,
   a counter control unit, and
   a sign determination unit,
   wherein when the first comparator and the second comparator compare the noise signals output from the first pixel and the second pixel with the reference signal, the counter control unit causes the first counter to count the number of clock pulses using one of the increase and decrease in the signal value of the count signal during a period of time during which the signal value of the first comparison result signal differs from the signal value of the second comparison result signal, wherein when the first comparator compares the first photoelectric conversion signal with the reference signal and if the second comparator compares the second photoelectric conversion signal with the reference signal, the counter control unit causes the first counter to count the number of clock pulses using the other of the increase and decrease in the signal value of the count signal during a period of time during which the signal value of the first comparison result signal differs from the signal value of the second comparison result signal, wherein when the first comparator compares the first photoelectric conversion signal with the reference signal and if the second comparator compares the second photoelectric conversion signal with the reference signal, the counter control unit causes the second counter to count the number of clock pulses using first counting in which the number of clock pulses is counted during a period of time during which the signal value of the first comparison result signal is the same as the signal value of the second comparison result signal and second counting in which the number of clock pulses is counted during a period of time during which the signal value of the first comparison result signal differs from the signal value of the second comparison result signal so that counting of the number of the clock pulses per unit time in the first counting is greater than counting of the number of clock pulses per unit time in the second counting, wherein during a period of time during which the signal values of the first comparison result signal and the second comparison result signal differ from the signal values obtained when comparison of the first photoelectric conversion signal and the reference signal performed by the first comparator and comparison of the second photoelectric conversion signal and the reference signal performed by the second comparator start, the counter control unit causes the first counter and the second counter to stop counting the number of clock pulses, causes the first counter to generate the first digital signal, and causes the second counter to generate the second digital signal, and wherein the sign determination unit determines whether the first digital signal is positive or negative based on an order in which each of the signal value of the first comparison result signal and the signal value of the second comparison result signal varies.

4. The image pickup apparatus according to claim 3, further comprising:

a plurality of sign memories each configured to hold one of a plus sign or a minus sign of the first digital signal determined by the sign determination unit; and a plurality of circuit units each electrically connected to one of the sign memories and the first counter.

5. The image pickup apparatus according to claim 1-2, further comprising:

an inverting amplifier, wherein signals output from the first and second pixels to the first and second comparators, respectively, are signals amplified by the inverting amplifier.

6. The image pickup apparatus according to claim 1, further comprising:

a plurality of microlenses each collecting light onto a plurality of the pixels.

7. An image pickup system comprising:

the image pickup apparatus according to claim 1; and an output signal processing unit configured to process a signal output from the image pickup apparatus.

8. A method for driving an image pickup apparatus, the image pickup apparatus including a first pixel and a second pixel each having a photoelectric conversion unit that generates a signal carrier based on incident light, and an analog-to-digital conversion unit, the analog-to-digital conversion unit including a first comparator that outputs a first comparison result signal having a signal value obtained by comparing the first photoelectric conversion signal with a reference signal having a potential varying in a time-dependent manner and a second comparator that outputs a second comparison result signal having a signal value obtained by comparing the second photoelectric conversion signal with the reference signal, the method comprising:

outputting, from the first pixel, a first photoelectric conversion signal based on the signal carrier;

outputting, from the second pixel, a second photoelectric conversion signal based on the signal carrier; and generating, using the analog-to-digital conversion unit, a first digital signal based on a difference between the first photoelectric conversion signal and the second photoelectric conversion signal and a second digital signal based on a sum of the first photoelectric conversion signal and the second photoelectric conversion signal based on the first comparison result signal and the second comparison result signal, wherein the image pickup apparatus further including first and second counters each generating a count signal having a signal value obtained by counting the number of clock pulses, the method further comprising:

selecting one of an increase and a decrease in the signal value of the count signal based on an order in which each of the first comparison result signal and the second comparison result signal varies and counting, using the first counter, the number of clock pulses during a period of time during which the signal value of the first comparison result signal differs from the signal value of the second comparison result signal;

generating, using the second counter, the count signal through first counting in which the number of clock pulses is counted during a period of time during which the signal value of the first comparison result signal is the same as the signal value of the second comparison result signal and second counting in which the number of clock pulses is counted during a period of time during which the signal value of the first comparison result signal differs from the signal value of the second comparison result signal so that counting of the number of clock pulses per unit time in the first counting is greater than counting of the number of clock pulses per unit time in the second counting; and during a period of time during which the signal values of the first comparison result signal and the second comparison result signal differ from the signal values obtained when comparison of the first photoelectric conversion signal and the reference signal and comparison of the second photoelectric conversion signal and the reference signal start, causing the first counter and the second counter to stop counting the number of the clock pulses, causing the first counter to generate the first digital signal, and causing the second counter to generate the second digital signal.

9. The method for driving an image pickup apparatus according to claim 8, wherein the image pickup apparatus further includes an inverting amplifier, and
wherein signals output from the first and second pixels to the first and second comparators, respectively, are signals amplified by the inverting amplifier.

10. A method for driving an image pickup apparatus, the image pickup apparatus including a first pixel and a second pixel each having a photoelectric conversion unit that generates a signal carrier based on incident light, and an analog-to-digital conversion unit, the analog-to-digital conversion unit including a first comparator that outputs a first comparison result signal having a signal value obtained by comparing the first photoelectric conversion signal with a reference signal having a potential varying in a time-dependent manner and a second comparator that outputs a second comparison result signal having a signal value obtained by comparing the second photoelectric conversion signal with the reference signal,
the method comprising:
outputting, from the first pixel, a first photoelectric conversion signal based on the signal carrier;
outputting, from the second pixel, a second photoelectric conversion signal based on the signal carrier; and
generating, using the analog-to-digital conversion unit, a first digital signal based on a difference between the first photoelectric conversion signal and the second photoelectric conversion signal and a second digital signal based on a sum of the first photoelectric conversion signal and the second photoelectric conversion signal based on the first comparison result signal and the second comparison result signal,
wherein each of the first pixel and the second pixel outputting a noise signal,
the analog-to-digital conversion unit further including first and second counters each generating a count signal having a signal value obtained by counting clock pulses,
the method further comprising:
when the first comparator and the second comparator compare the noise signals output from the first pixel and the second pixel with the reference signal, causing the first counter to count the number of clock pulses using one of the increase and decrease in the signal value of the count signal during a period of time during which the signal value of the first comparison result signal differs from the signal value of the second comparison result signal;
when the first comparator compares the first photoelectric conversion signal with the reference signal and if the second comparator compares the second photoelectric conversion signal with the reference signal, causing the first counter to count the number of clock pulses using the other of the increase and decrease in the signal value of the count signal during a period of time during which the signal value of the first comparison result signal differs from the signal value of the second comparison result signal;
when the first comparator compares the first photoelectric conversion signal with the reference signal and if the second comparator compares the second photoelectric conversion signal with the reference signal, causing the second counter to count the number of clock pulses using first counting in which the number of clock pulses is counted during a period of time during which the signal value of the first comparison result signal is the same as the signal value of the second comparison result signal and second counting in which the number of clock pulses is counted during a period of time during which the signal value of the first comparison result signal differs from the signal value of the second comparison result signal so that counting of the number of clock pulses per unit time in the first counting is greater than counting of the number of clock pulses per unit time in the second counting; during a period of time during which the signal values of the first comparison result signal and the second comparison result signal differ from the signal values obtained when comparison of the first photoelectric conversion signal and the reference signal performed by the first comparator and comparison of the second photoelectric conversion signal and the reference signal performed by the second comparator start, causing the first counter and the second counter to stop counting the number of clock pulses, causing the first counter to generate the first digital signal, and causing the second counter to generate the second digital signal; and
obtaining a signal indicating whether the first digital signal is positive or negative based on an order in which each of the first comparison result signal and the second comparison result signal varies.

11. A method for driving an image pickup system, the image pickup system including an image pickup apparatus, an output signal processing unit that processes a signal output from the image pickup apparatus, and an optical system that directs light to the image pickup apparatus,
the image pickup apparatus including a plurality of pixels each having a photoelectric conversion unit and outputting a photoelectric conversion signal based on a signal charge generated by the photoelectric conversion unit,
a plurality of microlenses each collecting light onto a plurality of the pixels,
a first comparator that outputs a first comparison result signal having a signal value obtained by comparing the photoelectric conversion signal of a first pixel among the plurality of pixels with a reference signal having a potential varying in a time-dependent manner,
a second comparator that outputs a second comparison result signal having a signal value obtained by comparing a photoelectric conversion signal of a second pixel different from the first pixel with the reference signal having a potential varying in a time-dependent manner, and
first and second counters each generating a count signal having a signal value obtained by counting the number of clock pulses,
the method comprising:
selecting one of an increase and a decrease in the signal value of the count signal based on an order in which each of the first comparison result signal and the second comparison result signal varies and counting, using the first counter, the number of clock pulses during a period of time during which the signal value of the first comparison result signal differs from the signal value of the second comparison result signal;
when the first comparator compares the photoelectric conversion signal of the first pixel with the reference signal and if the second comparator compares the photoelectric conversion signal of the second pixel with the reference signal,
causing the second counter to generate the count signal using first counting in which the number of clock pulses is counted during a period of time during which the signal value of the first comparison result signal is the same as the signal value of the second comparison result signal and second counting in which the number of clock pulses is counted during a period of time during which the signal value of the first comparison result signal differs from the signal value of the second comparison result signal so that counting of the number of clock pulses per unit time in the first counting is greater than counting of the number of clock pulses per unit time in the second counting;

during a period of time during which the signal values of the first comparison result signal and the second comparison result signal differ from the signal values obtained when comparison of the photoelectric conversion signal of the first pixel and the reference signal performed by the first comparator and comparison of the photoelectric conversion signal of the second pixel and the reference signal performed by the second comparator start, causing the first counter and the second counter to stop counting the number of clock pulses, causing the first counter to generate a first digital signal based on a difference between the photoelectric conversion signal of the first pixel and the photoelectric conversion signal of the second pixel, and causing the second counter to generate a second digital signal based on a sum of the photoelectric conversion signal of the first pixel and the photoelectric conversion signal of the second pixel;

causing the image pickup apparatus to output the first digital signal and the second digital signal to the output signal processing unit; and causing the output signal processing unit to perform focus detection based on the first digital signal and image formation based on the second digital signal.

12. The method for driving an image pickup apparatus according to claim 11, wherein the image pickup apparatus further includes an inverting amplifier, and wherein signals output from the first and second pixels to the first and second comparators, respectively, are signals amplified by the inverting amplifier.

\* \* \* \* \*